(12) United States Patent
Inomori et al.

(10) Patent No.: US 8,087,504 B2
(45) Date of Patent: Jan. 3, 2012

(54) FRICTION CLUTCH AND VEHICLE EQUIPPED WITH THE SAME

(75) Inventors: Toshinori Inomori, Shizuoka (JP); Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 555 days.

(21) Appl. No.: 12/274,760

(22) Filed: Nov. 20, 2008

(65) Prior Publication Data

US 2009/0127055 A1    May 21, 2009

(30) Foreign Application Priority Data

Nov. 21, 2007  (JP) .................................. 2007-301716
Oct. 10, 2008  (JP) .................................. 2008-264596

(51) Int. Cl.
*F16H 19/00*    (2006.01)
(52) U.S. Cl. ........................................................ 192/83
(58) Field of Classification Search .................... 192/83, 192/82 P, 105 B, 70.23, 85.5, 96, 35, 85.02, 192/70.11, 101, 89.21, 70.18
See application file for complete search history.

(56) References Cited

U.S. PATENT DOCUMENTS

| 2009/0127054 A1* | 5/2009 | Inomori et al. | 192/70.11 |
| 2009/0127056 A1* | 5/2009 | Inomori et al. | 192/70.12 |
| 2009/0127057 A1* | 5/2009 | Inomori et al. | 192/70.18 |

FOREIGN PATENT DOCUMENTS

| JP | 52-4955 A | 1/1977 |
| JP | 8-232981 A | 9/1996 |
| JP | 3381442 | 2/2003 |

* cited by examiner

*Primary Examiner* — David D Le
*Assistant Examiner* — David J Hlavka
(74) *Attorney, Agent, or Firm* — Dickstein Shapiro LLP

(57) ABSTRACT

A friction clutch includes clutch housing having a friction plate, a clutch boss having a clutch plate, a pressure plate, a sub clutch, and a power-assist mechanism. The power-assist mechanism receives torque from the pressure plate when the clutch is disengaged and converts the torque into a force for moving the pressure plate in a direction which separates the pressure plate from a plate group. A cam surface, which supports and guides one or more roller weights, is formed on the pressure plate. The one or more roller weights move outward in a radial direction by a movement amount according to the magnitude of centrifugal force and press the pressure plate toward the plate group with force according to the movement amount.

16 Claims, 9 Drawing Sheets

FRICTION CLUTCH AND VEHICLE EQUIPPED WITH THE SAME

PRIORITY INFORMATION

This patent application is based on and claims priority under 35 U.S.C. §119 to Japanese Patent Application No. 2007-301716, filed on Nov. 21, 2007, and Japanese Patent Application No. 2008-264596, filed on Oct. 10, 2008, the entire contents of which are hereby expressly incorporated by reference.

TECHNICAL FIELD

The present invention relates to a friction clutch and a vehicle equipped with the same.

BACKGROUND ART

Vehicles equipped with a friction clutch for engaging/disengaging the transmission of an engine drive force and a device for operating the friction clutch are well known. An example of a device used to operate a clutch is a clutch lever of a motorcycle.

Generally, as the size of a vehicle becomes larger, the capacity of the friction clutch becomes larger, and the force necessary to disengage the friction clutch also becomes larger. This, however, increases the load required to operate the clutch, which in turn impacts the operational burden on the rider. In order to reduce the load required to operate the clutch, and in turn the operational burden for the rider, a technique for attaching a so-called "power-assist device" to a friction clutch has been suggested, for example, in reference to Japanese Patent Application Publication 52-004955 and Japanese Patent 3381442.

The power-assisted friction clutch disclosed in Japanese Patent Application Publication 52-004955 includes a drive force transmission side rotating body having a drive force transmission side friction member, a driven force transmission side rotating body having a driven force transmission side friction member, and a pressure contact member for receiving the biasing force of a pressure contact spring to press the drive force transmission side friction member and the driven force transmission side friction member into contact with each other. As a power-assist device, the friction clutch includes an operating side rotating body which rotates integrally with the driven force transmission side rotating body, an operated side rotating body which rotates opposite to the operating side rotating body through a friction member, and a ball cam for moving the pressure contact member in a direction which separates the drive force transmission side friction member and the driven force transmission side friction member from each other when the operated side rotating body is under torque conditions.

The friction clutch, when disengaged, presses the operating side rotating body, which is pressed against the operated side rotating body through the friction member, transmitting torque to the operated side rotating body via the operating side rotating body. A ball cam moves the pressure contact member in a direction which separates the drive force transmission side friction member and the driven force transmission side friction member from each other. As a result, the friction clutch uses part of the torque of the driven force transmission side rotating body as force which separates the drive force transmission side friction member and the driven force transmission side friction member from each other. Therefore, the force necessary to separate the drive force transmission side friction member from the driven force transmission side friction member, i.e. the force necessary for disengaging a clutch, can be decreased.

However, the friction clutch has a problem in that a shift shock is relatively large when the clutch is engaged in an idling state like shifting gears from a neutral to a first gear. That is, since the friction clutch has a power-assist device, the force necessary for disengaging the clutch decreases, but when the clutch is engaged, since the drive force transmission side friction member, which is rotating, and the driven force transmission side friction member are pressed into contact with each other by the large capacity of the pressing contact spring, a relatively large shock occurs in engaging the clutch. Therefore, a problem arises in regard to the quality of ride, or feel, sensed by a rider of the vehicle, which tends to deteriorate with this known friction clutch setup.

SUMMARY

The present invention has been devised in consideration of the above-identified problems. To this end, one object of the present invention is to provide a friction clutch that can reduce not only the load necessary for disengaging the clutch, and hence the operational burden of the clutch, but also the shift shock which occurs when the clutch is engaged in an idling state.

A friction clutch according to one embodiment of the present invention comprises a drive side rotating body having a first plate, a driven side rotating body having a second plate disposed opposite to the first plate in a predetermined direction, a pressure plate which rotates together with the drive side rotating body and moves in the predetermined direction to contact the first plate with the second plate, a power-assist mechanism which receives torque of the pressure plate and converts the torque into force for moving the pressure plate in a direction which separates the first plate and the second plate from each other when the clutch is disengaged, and a centrifugal weight configured to move outward with regard to a radial direction of the pressure plate, wherein the amount of movement is based on the magnitude of centrifugal force applied to the weight, and the weight presses the pressure plate in a direction for contacting the first plate with the second plate with a force according to the amount of movement.

Because the frictional clutch has a power-assist mechanism, the force necessary for disengaging the clutch can be reduced. Further, when rotating at a high speed, the centrifugal weight moves outward in a radial direction to press the pressure plate with relatively large force. As a result, the first plate and second plate contact each other with relatively large force, so that relatively large friction force results therebetween. Therefore, slippage between the first and second plates can be prevented, and consequently, a relatively large torque can be effectively transmitted to the driven side rotating body from the drive side rotating body. Meanwhile, when rotating at a low speed, the centrifugal weight is located in a relatively inner position relative to the radial direction, and therefore, the force with which the centrifugal weight presses the pressure plate is relatively small. Consequently, the shift shock which occurs when the clutch is engaged in an idling state may be advantageously decreased.

Thus, the friction clutch of the present invention is configured to decrease not only the operational load necessary to disengage the clutch but also the shift shock which occurs when the clutch is engaged in an idling state.

BRIEF DESCRIPTION OF THE DRAWINGS

FIG. 9b is a schematic view of balls disposed between a first cam plate shown in FIG. 9c and the second cam plate shown in FIG. 9a.

DETAILED DESCRIPTION

Various embodiments of the present invention are described with reference to the accompanying drawings below. For sake of simplifying the description in the following drawings, like elements are denoted by the same reference symbols.

First Embodiment

Hereinafter, a motorcycle 1 having a friction clutch 2 according to a first embodiment of the present invention will be described in detail with reference to the drawings. The motorcycle 1 and the clutch 2 described below are merely examples according to preferred embodiments. A vehicle according to the present invention is not limited to motorcycle 1 described below. A vehicle according to the present invention is also not limited to a conventional motorcycle, such as a motorcycle, a moped, and a scooter, but may include other types of vehicles such as an all terrain vehicle (ATV). Accordingly, the term "motorcycle" as used herein is not to be limited to a two-wheeled vehicle but may also include vehicles having three or more wheels. In other words, in this specification, the term "motorcycle" is intended to generally refer to vehicles that are designed to be tilted when making a turn.

Figure 1:
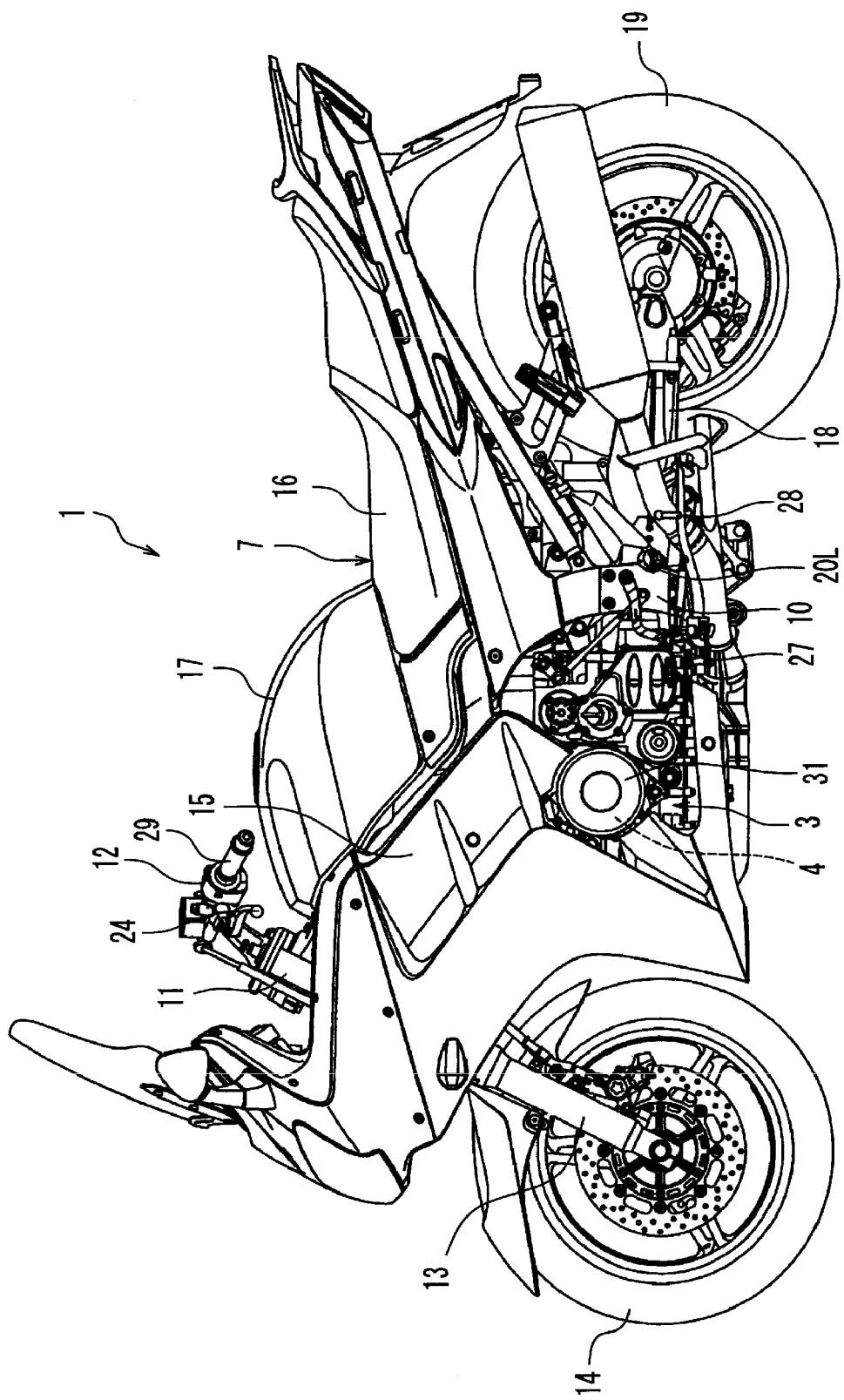
FIG. 1 is a side perspective view of a motorcycle.

FIG. 1 is a left side perspective view illustrating a motorcycle 1 according to the first embodiment of the present invention. In the description below, the terms "front", "back", "left" and "right" refer to directions as viewed from a rider sitting on a seat 16 of motorcycle 1.

Configuration of Motorcycle

As shown in FIG. 1, motorcycle 1 includes a vehicle body 7, a front wheel 14 provided at a front section of the vehicle body 7, and a rear wheel 19 provided at a rear section of the vehicle body 7.

The vehicle body 7 includes a vehicle body frame 10. The vehicle body frame 10 includes a head pipe 11. A handlebar 12 is attached to an upper end of the head pipe 11. The front wheel 14 is rotatably attached to a lower end of the head pipe 11 through a front fork 13.

A power unit 3 is suspended from the vehicle body frame 10. A vehicle body cover 15 is attached to the vehicle body frame 10. Based on a front-rear direction, a seat 16 is disposed so as to extend rearward from a substantially central position of the vehicle body 7. A fuel tank 17 is disposed in front of the seat 16.

A rear arm 18 is pivotally supported on the vehicle body frame 10. The rear wheel 19 is rotatably attached to a rear end of the rear arm 18. The rear wheel 19 is connected to an engine 4 (see FIG. 2) through a power transmission mechanism (not shown). The drive force of the engine 4 is thereby transmitted to the rear wheel 19 so that the rear wheel 19 rotates. An accelerator grip (not shown) is provided on the right side of the handle 12. A left grip 29 is provided on the left side of the handlebar 12. A clutch lever 24 that is operated to engage/disengage friction clutch 2 (see FIG. 2), which is described later, is provided in front of the left grip 29 of the handlebar 12.

Footrests 20L are provided on each side of the vehicle body 7 at a central portion thereof in the front-rear direction. A shift pedal 27 is operated to change the transmission gear ratio of a transmission 5 (see FIG. 2), which will be described later, is provided on the left side of the vehicle body 7 at a position slightly in front of the left footrest 20L. A side stand 28 is provided on the left side of the vehicle body 7 at a position below the shift pedal 27 and the footrest 20L.

Configuration of Power Unit

Figure 2:
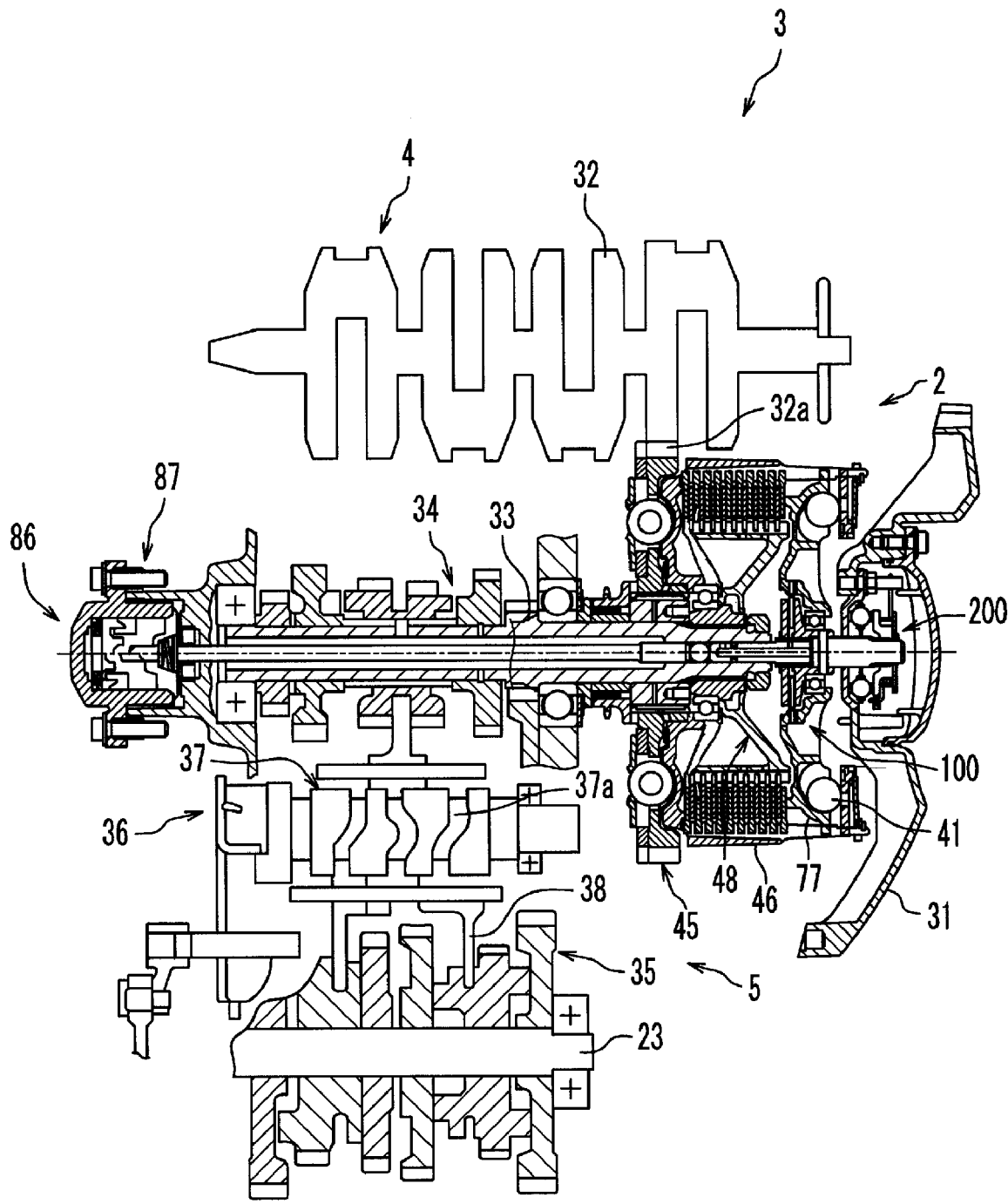
FIG. 2 is a schematic diagram illustrating the main components of a power unit of the motorcycle of FIG. 1 according to a first embodiment of the present invention.

The configurations of the main components of a power unit 3 of motorcycle 1 will now be described with reference to FIG. 2. As shown in FIG. 2, the power unit 3 includes the engine 4, the transmission 5, and the clutch 2. The engine 4 is not limited to a particular type of engine. In the present embodiment of the present invention, a water-cooled, four-cycle, parallel four-cylinder engine is used as the engine 4.

Although not shown, the engine 4 includes four cylinders, a piston reciprocating in each of the respective cylinders, and a crankshaft 32 connected to each of the pistons through a connecting rod. The crankshaft 32 extends in a vehicle width direction. A reference numeral 31 denotes a crankcase.

As shown in FIG. 2, the crankshaft 32 is connected to the transmission 5 through the clutch 2. The transmission 5 includes a main shaft 33, a drive shaft 23, and a gear selection mechanism 36. The main shaft 33 is connected to the crankshaft 32 through the clutch 2. The main shaft 33 and the drive shaft 23 are disposed parallel to the crankshaft 32, respectively.

A plurality of multi-stage transmission gears 34 are mounted on the main shaft 33. A plurality of transmission gears 35 corresponding to the multi-stage transmission gears 34 are mounted on the drive shaft 23. The multi-stage transmission gears 34 and the plurality of transmission gears 35 are disposed so that only one pair of selected gears are engaged with each other. Either the transmission gears 34 excluding the selected transmission gear 34 or the transmission gears 35 excluding the selected transmission gear 35 are rotatable with respect to the main shaft 33 or the drive shaft 23 or both. That is, at least one of the non-selected transmission gears 34 or the non-selected transmission gears 35 run idle with respect to the main shaft 33 or the drive shaft 23. In other words, rotation is transmitted between the main shaft 33 and the drive shaft 23 only by the selected transmission gear 34 and the selected transmission gear 35 which are engaged with each other.

The transmission gears 34 and 35 are selected by the gear selection mechanism 36. Specifically, the transmission gears 34 and 35 are selected by a shift cam 37 of the gear selection mechanism 36. A plurality of cam grooves 37a are formed on an outer circumferential surface of the shift cam 37. A shift fork 38 is engaged with each cam groove 37a. Each shift fork 38 is engaged with predetermined transmission gears 34 and 35 of the main shaft 33 and the drive shaft 23, respectively. As the shift cam 37 rotates, shift forks 38 are guided in their respective cam grooves 37a to move in a direction of the main shaft 33, so that gears which are engaged with each other are selected from the transmission gears 34 and 35. Specifically, among the multi-stage transmission gears 34 and the plurality of transmission gears 35, only one pair of gears disposed at positions corresponding to a rotational angle of the shift cam 37 are fixed with respect to the main shaft 38 and the drive shaft 23 by a spline. As a result, the transmission gear position is determined, and rotation between the main shaft 33 and the drive shaft 23 is transmitted at a predetermined transmission gear ratio through the transmission gears 34 and 35. The gear selection mechanism 36 is operated by the shift pedal 27 shown in FIG. 1. In the above-mentioned configuration, after a pair of transmission gears 34 and 35 is fixed to the main shaft 33 and the drive shaft 23 and the clutch 2 is engaged, when the engine 4 is driven a drive force of the engine 4 is transmitted to the main shaft 33 through the clutch 2. The rotation is transmitted at a predetermined transmission gear ratio between the main shaft 33 and the drive shaft 23 through a pair of transmission gears 34 and 35, so that the drive shaft 23 is driven to rotate. When drive shaft 23 is driven to rotate, drive force is transmitted by a transmission mechanism (not shown) such as a chain connecting the drive shaft 23 and the rear wheel 19, so that the rear wheel 19 is rotated. In the embodiment of the present invention, a power transmission mechanism which connects the engine 4 and the rear wheel 19 comprises the clutch 2, the transmission 5 and a transmission mechanism (not shown) such as a chain.

Configuration of Clutch

In the embodiment of the present invention, the clutch 2 comprises a friction clutch of the wet multi-plate type. The clutch 2 is a centrifugal clutch which is automatically engaged/disengaged in starting or stopping motorcycle 1 and which is optionally engaged/disengaged by the clutch lever 24 operated by a rider. A configuration of the clutch 2 will be described below with reference to FIGS. 2, 3 and 4.

Clutch Housing 46

Figure 3:
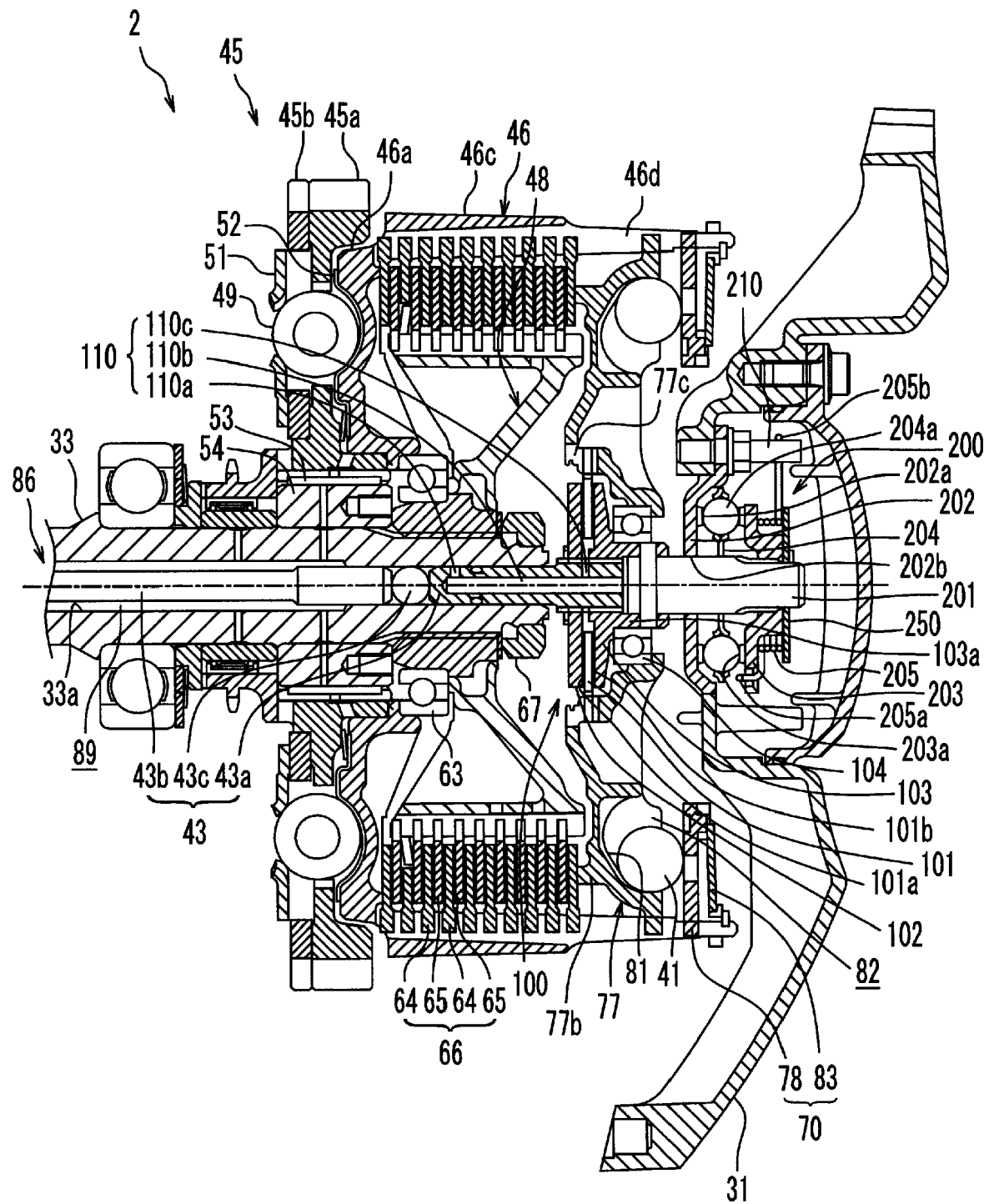
FIG. 3 is a cross-sectional view illustrating a clutch according to a first embodiment of the present invention.

As shown in FIG. 3, the clutch 2 includes a clutch housing 46. The main shaft 33 passes through the clutch housing 46. The clutch housing 46 includes a housing body 46c. The housing body 46c is formed in a substantially cylindrical form that is closed at one end by a bottom 46a. The main shaft 33 also extends through the bottom 46a of the housing body 46c. A plurality of pairs of arms 46d are provided on the housing body 46c. Each arm 46d extends outward from the bottom 46a toward the outside in a vehicle width direction.

As shown in FIG. 3, a vehicle width direction may be also referred to as a left-right direction. In the embodiment of the present invention, the clutch 2 is disposed on the right side of the main shaft 33. Thus, "outside" in the vehicle width direction corresponds to the right side, and "inside" in the vehicle width direction corresponds to the left side. Therefore, the "outside" and the "inside" in the vehicle width direction will be referred to simply as the "right side" and the "left side," respectively.

Scissor Gear 45

A scissor gear 45 is attached to the clutch housing 46. The scissor gear 45 includes two gears 45a and 45b, a spring 49, and two plates 51 and 52. The gear 45a and the gear 45b are located between the two plates 51 and 52. The two plates 51 and 52 are fixed to each other in the axial direction of the main shaft 33 with fixing parts such as rivets or screws. Therefore, the two gears 45a and 45b are substantially fixed to each other with respect to the axial direction of the main shaft 33. Meanwhile, the gears 45a and 45b are rotatable with respect to a rotational direction.

The gears 45a and 45b have the same number of teeth. The gears 45a and 45b are arranged so that their teeth are alternately located in a circumferential direction. The spring 49 is provided between the gears 45a and 45b. Therefore, the gears 45a and 45b receive torque supplied by the spring 49. Thus, the torque variations caused by the engine 4 can be absorbed.

The gear 45a of the scissor gear 45 is engaged with a gear 32a (FIG. 2) of the crankshaft 32. The gear 45a (of the scissor gear 45) is fixed to the bottom 46a of the clutch housing 46 so as to be unrotatable relative thereto. With such a configuration, the gear 45a of the scissor gear 45 and the clutch housing 46 integrally rotate following the rotation of the crankshaft 32.

A needle bearing 53 and a spacer 54, which is nonrotatably fixed to the main shaft 33, are disposed between the scissor gear 45 and the main shaft 33. The needle bearing 53 makes the scissor gear 45 rotatable with respect to main shaft 33. In other words, rotation of the scissor gear 45 is not transmitted directly to the main shaft 33.

Clutch Boss 48

A clutch boss 48 is nonrotatably fixed to the main shaft 33 by a nut 67. That is, the clutch boss 48 rotates together with the main shaft 33. A thrust bearing 63 is disposed between the clutch boss 48 and the scissor gear 45. Thus, the thrust bearing 63 prevents the gaps between each of scissor gear 45, the needle bearing 53, the spacer 54, and the clutch boss 48 from becoming smaller than a predetermined distance. In other words, movement of the scissor gear 45, the needle bearing 53, and the spacer 54 toward the clutch boss 48 in the axial direction of the main shaft 33 is restricted.

Plate Group 66

A plurality of friction plates 64 are arranged inside the clutch housing 46. Each friction plate 64 is fixed to the clutch housing 46 with respect to the rotational direction of the main shaft 33. Thus, the plurality of friction plates 64 rotate together with the clutch housing 46. Each friction plate 64 is displaceable in the axial direction of the main shaft 33. Thus, the distance between two adjacent friction plates 64 is variable.

The plurality of friction plates 64 are arranged in the axial direction of the main shaft 33. Each clutch plate 65 is disposed between adjacent friction plates 64. The clutch plate 65 is opposed to the adjacent friction plates 64. Each clutch plate 65 is fixed to the clutch boss 48 with respect to the rotational direction of the main shaft 33. Thus, the plurality of clutch plates 65 rotate together with the clutch boss 48. Further, each clutch plate 65 is displaceable with respect to the axial direction of the main shaft 33. Thus, the distance between mutually adjacent clutch plates 65 is variable.

In the present embodiment, a plate group 66 comprised of the plurality of friction plates 64 and the plurality of clutch plates 65, as shown in FIG. 3.

Pressure Plate 77

A pressure plate 77 is arranged on the right side of the main shaft 33, as depicted in reference to FIG. 3. The pressure plate 77 is formed into a substantially disc shape. A sub clutch 100, to be described later, is provided at a central portion of the pressure plate 77. A radially outward end of the pressure plate 77 is engaged with arms 46d. Therefore, the pressure plate 77 is not rotatable with respect to the clutch housing 46 but it rotates together with the clutch housing 46.

A pressing portion 77b that projects toward the plate group 66 is formed on the pressure plate 77 at an outer section thereof, as illustrated in FIG. 3. The pressing portion 77b faces the rightmost friction plate 64 in the plate group 66. When the pressure plate 77 moves leftward, the pressing portion 77b pushes the plate group 66 leftward. As a result, the friction plates 64 and the clutch plates 65 in the plate group 66 are pressed into frictional contact with each other.

A plurality of cam surfaces 81, each of which supports a roller weight 41, are formed on a surface opposite to the plate group 66 in the radially outward portion of the pressure plate 77. The plurality of cam surfaces 81 and the plurality of roller weights 41 are provided along the circumferential direction. The plurality of cam surfaces 81 are arranged radially about the longitudinal axis of the main shaft 33. Each cam surface 81 is inclined rightward as it moves outward in the radial direction.

A roller retainer 78 is disposed on the right side of the pressure plate 77. The roller retainer 78 is formed in a shape of a orbicular zone when viewed from the axial direction of the main shaft 33. The roller retainer 78 is opposed to the cam surface 81 of the pressure plate 77. Therefore, a space 82 that becomes narrower in the radial direction of the main shaft 33 is formed by each cam surface 81 and the roller retainer 78.

Similar to the pressure plate 77, a radially outward end of the roller retainer 78 is engaged with the plurality of arms 46d. The roller retainer 78 is thereby nonrotatable about the clutch housing 46. In other words, the roller retainer 78 rotates together with the clutch housing 46. Meanwhile, the roller retainer 78 is displaceable with respect to the clutch housing 46 in the axial direction of the main shaft 33.

The roller retainer 78 is urged leftward by a disc spring 83 which serves as a biasing member. In other words, the roller retainer 78 is urged toward the plate group 66 by disc spring 83. The roller retainer 78 and the disc spring 83 constitute an abutment member 70 that presses the roller weights 41 toward the cam surface 81.

A roller weight 41 is provided in each of a plurality of spaces 82. The roller weight 41 revolves following the rotation of the clutch housing 46 and moves on the cam surface 81 radially outward by means of a centrifugal force generated during the revolution. The roller weight 41 receives a reaction force from the abutment member 70 and presses the pressure plate 77 toward the plate group (66) side.

When the rotational speed of the crankshaft 32 is lower than a predetermined value, such as an idling state, the rotational speed of the clutch housing 46 also becomes lower. Therefore, centrifugal force applied to the roller weight 41 is relatively small, and so the roller weight 41 is located relatively inward. Therefore, the force which the roller weight 41 presses the pressure plate 77 to the left becomes substantially zero. As a result, the plate group 66 enters a substantially non-contact state where it is not pressed by the pressure plate 77. Therefore, rotation of the clutch housing 46 is not transmitted to the clutch boss 48. In other words, the clutch 2 enters a disengaged state.

When the rotational speed of the crankshaft 32 increases, the rotational speed of the clutch housing 46 increases accordingly. As the rotational speed of the clutch housing 46 increases, the centrifugal force applied to the roller weights 41 also increases. If the centrifugal force applied to the roller weights 41 is equal to or more than a predetermined value, the roller weights 41 move outward. The pressure plate 77 is thereby pressed toward the left side by the roller weights 41 and moves toward the plate group 66. As a result, the plate group 66 is placed in a frictional contact state and the clutch 2 enters an engaged state.

When the plate group 66 is in a pressed-contact state and the clutch 2 is engaged as described above, the rotation of the clutch housing 46 is transmitted to the clutch boss 48 through the plate group 66. As a result, the clutch boss 48 rotates together with the clutch housing 46.

If the rotational speed of the crank shaft 32 decreases while the clutch 2 is in the engaged state, the centrifugal force applied to the roller weights 41 is reduced. Therefore, the roller weights 41 move inward in the radial direction. As a result, the force applied by the pressure plate 77 to press the plate group 66 is reduced to substantially zero and the state of the clutch 2 is changed to the disengaged state.

As described above, the motorcycle 1 is provided with the centrifugal clutch 2. Therefore, when the vehicle starts or stops, the clutch 2 is automatically engaged or disengaged in accordance with the rotational speed of the engine 4, and it is unnecessary to operate the clutch lever 24. Therefore, in the motorcycle 1 according to the first embodiment, the burden of operation placed on the driver during starting or stopping the motorcycle can be reduced.

Sub Clutch 100

As shown in FIG. 3, the clutch 2 according to the present embodiment includes a sub-clutch 100. The sub-clutch 100 includes a friction plate 101, a first pressing plate 102 that faces a left surface (hereinafter, "first friction surface") 101a of the friction plate 101, and a second pressing plate 103 that faces a right surface (hereinafter, "second friction surface") 101b of the friction plate 101.

The friction plate 101 is engaged with the pressure plate 77 so as to rotate together with the pressure plate 77. Specifically, one or more slide arm sections 77c are formed on the pressure plate 77. One or more corresponding grooves (not shown) are formed on a radially outward side of the friction plate 101. Each groove (of the friction plate 101) is slidably engaged with a slide arm section 77c, whereby the friction plate 101 rotates together with the pressure plate 77.

The first pressing plate 102 is fixed to a short push rod 43a, which will be described below. Therefore, the first pressing plate 102 moves together with the short push rod 43a in the axial direction of main shaft 33. In addition, the first pressing plate 102 rotates together with the short push rod 43a.

The second pressing plate 103 is fitted onto the short push rod 43a by way of matching serrated surfaces. Thus, the second pressing plate 103 rotates together with the short push rod 43a but is movable relative to the short push rod 43a in the axial direction of main shaft 33. The second pressing plate 103 includes a boss 103a extending rightward. This boss 103a rotatably supports the pressure plate 77 via a bearing 104. The second pressing plate 103 and the pressure plate 77 are thereby relatively rotatable about each other. Furthermore, the second pressing plate 103 and the pressure plate 77 are configured to move integrally in the axial direction of main shaft 33.

When the short push rod 43a moves rightward, the first pressing plate 102 also moves rightward. The first pressing plate 102 presses the friction plate 101 against the second pressing plate 103 accordingly. As a result, the friction plate 101 is sandwiched between the first pressing plate 102 and the second pressing plate 103. A torque of the pressure plate 77 is thereby transmitted to the first pressing plate 102 and the second pressing plate 103 via the friction plate 101.

As described later, a through-hole 33a is formed within the main shaft 33. The short push rod 43a, a ball 43c, and a long push rod 43b of a push mechanism 43 are inserted into the through-hole 33a. A gap 89 between an inner wall of the through-hole 33a and the long push rod 43b serves as an oil supply path for supplying oil to the clutch 2.

Moreover, an oil supply path 110 that guides the oil in the gap 89 to the sub clutch 100 is formed in the short push rod 43a. The oil supply path 110 is configured to include an oil introduction path 110a formed in a left portion of the short push rod 43a, an oil path 110b formed at a central portion of the short push rod 43a, and an oil discharge path 110c formed in a right portion of the short push rod 43a. The oil introduction path 110a comprises a hollow conduit extending in the radial direction and connected to the oil path 110b extending in an axial direction of main shaft 33. Likewise, the oil lead-out path 110c comprises a hollow conduit extending radially and connected to the oil path 110b. An outlet of the oil discharge path 110c, that is, the radially outward opening of the oil discharge path 110c, is open toward the first friction surface 101a and the second friction surface 101b of the friction plate 101. Thus, the oil on the oil supply path 110 is supplied toward the first friction surface 101a and the second friction surface 101b.

Power-Assist Mechanism

As shown in FIG. 3, the clutch 2 according to the present embodiment includes a power assist mechanism 200. The power-assist mechanism 200 converts part of the torque of the pressure plate 77 into a force for disengaging the clutch 2 so as to reduce the force required to disengage the clutch 2. The power-assist mechanism 200 according to the present embodiment comprises a so-called ball cam. Particularly, the power-assist mechanism 200 includes a slide shaft 201 fixed to the second pressing plate 103, a first cam plate 202, a second cam plate 203, a ball plate 204, and a coil spring 205 that biases the second cam plate 203 in a direction which separates the second cam plate 203 from the first cam plate 202. A support plate 250 that supports the coil spring 205 by abutting a right portion of the coil spring 205 is fixed onto a terminal side of the slide shaft 201.

Figure 5A:
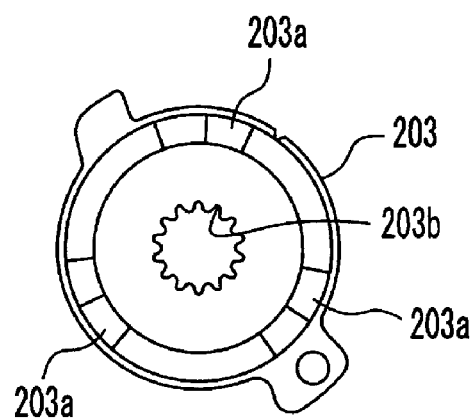
FIG. 5a is a rear view illustrating a second cam plate of a power-assist mechanism according to the first embodiment of the present invention.
Figure 5B:
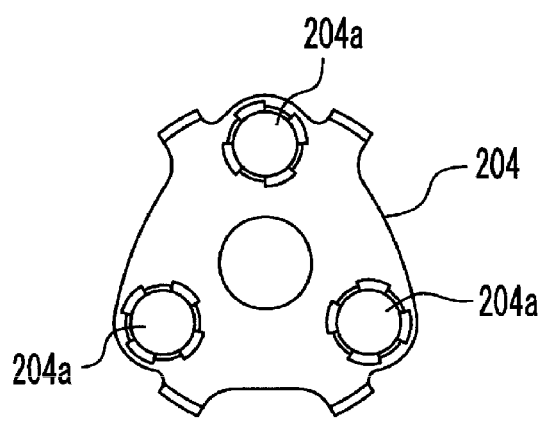
FIG. 5b is a front view illustrating a ball plate of the power-assist mechanism according to the first embodiment of the present invention.

As shown in FIG. 5(b), three balls 204a are rollably supported on the ball plate 204. The three balls 204a are arranged equidistantly in a circumferential direction about a longitudinal axis of the slide shaft 201. However, the number of balls 204a supported on ball plate 204 does not have to be limited to three. Other ball cam configurations may be utilized as needed.

Figure 5C:
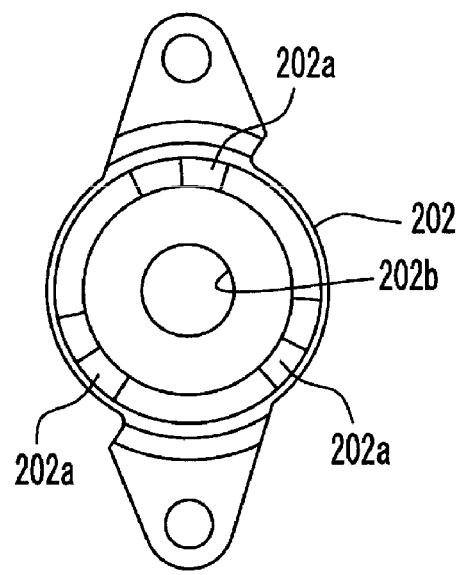
FIG. 5c is a front view illustrating a first cam plate of the power-assist mechanism according to the first embodiment of the present invention.

As shown in FIG. 5(c), a through-hole 202b is formed at a central portion of the first cam plate 202. As shown in FIG. 3, the slide shaft 201 is inserted through the through-hole 202b. The slide shaft 201 is movable axially with respect to the first cam plate 202 and rotatable with respect to the first cam plate 202. That is, the first cam plate 202 is configured not to rotate even if the slide shaft 201 rotates.

As shown in FIG. 5(a), a serrated hole 203b is formed at a central portion of the second cam plate 203. The second cam plate 203 is fitted onto a corresponding serrated portion of the slide shaft 201. Thus, the second cam plate 203 is axially movable with respect to the slide shaft 201 and rotates together with the slide shaft 201.

One end 205a of the coil spring 205 is secured to the second cam plate 203. The other end 205b of the coil spring 205 is secured to a pin 210 fixed to the crankcase 31. Therefore, the second cam plate 203 receives a torque from the coil spring 205 that urges the second cam plate 203 to rotate around the slide shaft 201 in a predetermined direction discussed below. In addition, the second cam plate 203 receives a slide force, depending on a total biasing force applied by the disc spring 83 and the coil spring 205, which urges the second cam plate 203 to move toward the first cam plate 202 in the axial direction of the slide shaft 201.

First cam surfaces 202a are formed on the right side of the first cam plate 202 (or the front side of the sheet in FIG. 5c). Second cam surface 203a are formed on the left side of the second cam plate 203 (or see the front side of the sheet in FIG. 5a). The first cam surfaces 202a and the second cam surfaces 203a are shaped such that the balls 204a move out of spaces formed by opposing valleys, or low spots, on the cam surfaces 202a and 203a and ride up on opposing cam lobes of cam surfaces 202a and 203a when the second cam plate 203 rotates in a predetermined direction. The balls 204a then return to the spaces formed by the opposing valleys of cam surface 202a and 203a when the second cam plate 203 rotates in a reverse direction opposite to the predetermined direction. In other words, the cam surface 202a and 203a are shaped such that, when the second cam plate 203 rotates in the predetermined direction against the total biasing force applied by the disc spring 83 and the coil spring 205, the plates 202 and 203 are pushed away from each other by the balls 204a so that the second cam plate 203 is moved rightward. In addition, the cam surface 202a and 203a are shaped such that, when the second cam plate 203 rotates in the reverse direction, the second cam plate 203 moves leftward due to the total biasing force applied by the disc spring 83 and the coil spring 205.

Clutch Release Mechanism 86

The clutch 2 according to the present embodiment includes a clutch release mechanism 86 (FIG. 3). The clutch release mechanism 86 forcibly releases a pressed-contact state of the plate group 66 in response to the operation of the clutch lever 24 by a rider. Clutch release mechanism 86 enables the clutch 2 to be disengaged by the manual operation of a rider of the motorcycle 1.

The clutch release mechanism 86 includes the push mechanism 43 (see FIG. 3) and a drive mechanism 87 (see FIG. 4) for driving the push mechanism 43. As shown in FIG. 3, the push mechanism 43 includes the short push rod 43a, the long push rod 43b, and the ball 43c interposed between the short push rod 43a and the long push rod 43b. The through-hole 33a is formed in the main shaft 33 and the push mechanism 43 is arranged within the through-hole 33a. It should be noted that the through-hole 33a also serves as an oil supply path for supplying the oil to the respective sliding portions or the like of the clutch 2. Specifically, the oil is supplied to the respective sliding portions of the clutch 2 via the gap 89 between the inner wall of the through-hole 33a and the push mechanism 43.

A right end of the short push rod 43a protrudes from the main shaft 33 and is attached to the first pressing plate 102 of the sub clutch 100. Thus, when the sub clutch 100 is engaged, the short push rod 43a rotates with the pressure plate 77. Further, when the sub clutch 100 and the clutch 2 are engaged, the short push rod 43a rotates in response to rotation of the clutch housing 46. On the other hand, the long push rod 43b does not rotate together with the main shaft 33. Thus, the ball 43c is provided between the short push rod 43a and the long push rod 43b to reduce the sliding resistance between the short push rod 43a and the long push rod 43b.

Figure 4:
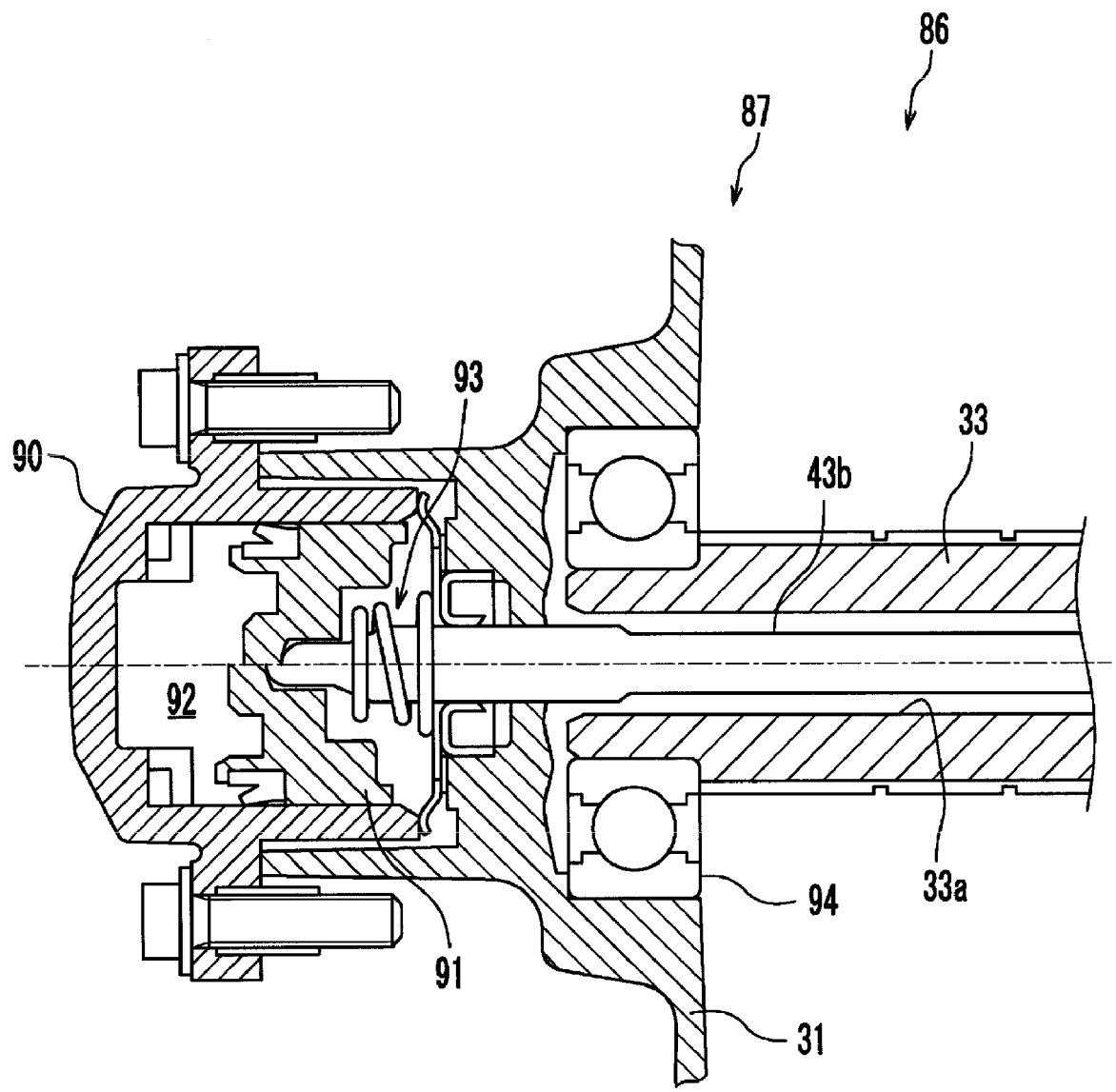
FIG. 4 is a cross-sectional view illustrating a push rod drive mechanism that may be used to disengage the clutch.

FIG. 4 is a cross-sectional view showing the push rod drive mechanism 87. As shown in FIG. 4, the left end of the long push rod 43b extends to the push rod drive mechanism 87. In FIG. 4, the section below the longitudinal axis of the main shaft 33 represents the state in which the clutch release mechanism 86 is not being driven. In other words, the section below the longitudinal axis of the main shaft 33 in FIG. 4 represents the state in which the push mechanism 43 is shifted relatively to the left and the pressure plate 77 is not displaced rightward by the push mechanism 43. On the other hand, the section above the longitudinal axis of the main shaft 33 in FIG. 4 represents the state in which the clutch release mechanism 86 is being driven. In other words, the section above the longitudinal axis of the main shaft 33 represents the state in which the push mechanism 43 is shifted relatively to the right and the pressure plate 77 is displaced rightward by the push mechanism 43.

As shown in FIG. 4, the drive mechanism 87 includes a cylinder 90 and a piston 91. The piston 91 is slidable within the cylinder 90 in the axial direction of the main shaft 33. The piston 91 is attached to the long push rod 43b. Thus, when the piston 91 slides, the long push rod 43b also moves in the axial direction of the main shaft 33.

An operating chamber 92 is defined and formed between the piston 91 and the inner wall of cylinder 90. The operating chamber 92 is filled with oil.

A helical compression spring 93 is disposed between the piston 91 and the crankcase 31. The piston 91 is urged leftward in FIG. 4 away from the crankcase 31 by the helical compression spring 93. In other words, the piston 91 is urged in the direction in which the push mechanism 43 is displaced leftward to engage the clutch 2. Thus, when a rider of the motorcycle 1 releases the operation of the clutch lever 24 (FIG. 1), the push mechanism 43 automatically moves leftward.

Operation of Clutch

The operation of the clutch 2 will now be described. First, an operation for causing the clutch 2 to be disengaged will be described.

When a rider of the motorcycle 1 grasps the clutch lever 24 (see FIG. 1), the internal pressure of the operating chamber 92 of the drive mechanism 87 rises. The piston 91 thereby moves rightward (in FIG. 4) and the long push rod 43b also moves rightward. The ball 43c and the short push rod 43a thereby move to the right and the first pressing plate 102 of the sub clutch 100 moves rightward. The friction plate 101 of the sub clutch 100 is thereby sandwiched between the first pressing plate 102 and the second pressing plate 103, so that the sub clutch 100 enters an engaged state. The slide shaft 201 of the power assist mechanism 200 thereby rotates with the pressure plate 77 in a predetermined direction.

If the slide shaft 201 rotates in the predetermined direction, the second cam plate 203 of the power-assist mechanism 200 also rotates in the same direction. Thus, the balls 204a on the ball plate 204 move out of the spaces formed by opposing valleys on the surfaces 202a and 203a and ride up on opposing cam lobes of cam surfaces 202a and 203a. The second cam plate 203 is thus pushed to the right by the balls 204a. Therefore, the slide shaft 201 is also pushed to the right. As a result, the pressure plate 77 moves to the right by a force by which the short push rod 43a presses the pressure plate 77 rightward via the first pressing plate 102 and the friction plate 101 and a force by which the slide shaft 201 pulls the pressure plate 77 rightward via the second pressing plate 103 and the bearing 104. Accordingly, the pressed-contact state of the disc group 66 is thereby released to disengage the clutch 2.

It should be noted that rotation of the second cam plate 203 is restricted so as not to exceed a predetermined amount. For this reason, in the state in which the clutch 2 is disengaged, the friction plate 101 rotates with respect to the first pressing plate 102 and the second pressing plate 103. That is, the friction plate 101 slides with respect to the first pressing plate 102 and the second pressing plate 103. However, since the oil is supplied to the first friction surface 101a and the second friction surface 101b of the friction plate 101, wear of the friction plate 101 is suppressed.

Next, an operation for engaging the clutch 2 will be described.

In order to engage the clutch 2, a rider lets go of his or her hold of the clutch lever 24. The internal pressure of the operating chamber 92 of the drive mechanism 87 thereby decreases. Accordingly, the piston 91 and the long push rod 43b move leftward in FIG. 4. The ball 43c and the short push rod 43a also move to the left and the first pressing plate 102 of the sub clutch 100 move to the left. Due to this, the first pressing plate 102 of the sub clutch 100 separates from the friction plate 101. Further, the second pressing plate 103 is not pressed rightward by the first pressing plate 102. Consequently, a rightward pressing force against the slide shaft 201 is eliminated and the second cam plate 203, which receives the biasing force of the coil spring 205, rotates in the reverse direction, whereby the second cam plate 203 and the slide shaft 201 move to the left. As a result, the second pressing plate 103 also moves to the left.

Moreover, because the rightward pressing force applied by the first pressing plate 102 has been removed, the pressure plate 77 moves leftward by the biasing force of the disc spring 83. As a result, the plate group 66 is pressed into frictional contact with each other by the pressure plate 77 so that the clutch 2 is engaged. At this time, the friction plate 101 of the sub clutch 100 separates from the second pressing plate 103.

In the clutch 2 according to the first embodiment of the present invention, the biasing force applied to the pressure plate 77 by the disc spring 83 varies according to the radial position of the roller weights 41. Specifically, when the rotational speed of the pressure plate 77 is high, the roller weights 41 move outward in a radial direction. As a result, the roller weights 41 move rightward to greatly deform the disc spring 83. Therefore, the biasing force which the pressure plate 77 receives from the disc spring 83 increases relatively because the disc spring 83 is greatly deformed by the roller weights 41. As a result, large biasing forces can be achieved without the need to set a high coefficient of elasticity of the disc spring 83. Thus, the biasing force applied to the pressure plate 77 by the disc spring 83 becomes relatively large. Meanwhile, if a rotational speed of the pressure plate 77 is low, the roller weights 41 move inward in the radial direction. As a result, the roller weights 41 move leftward and the deformation of the disc spring 83 decreases. Therefore, the biasing force the pressure plate 77 receives from the disc spring 83 becomes relatively small.

When the rotational speed of the engine is high, the pressure plate 77 presses the plate group 66 into contact with each other with a large pressing force. In the clutch 2 according to the present embodiment, when the rotational speed of the engine increases, the roller weights 41 move outward in a radial direction and the amount of deformation of the disc spring 83 increases accordingly. Thus, a sufficiently large pressing force can be obtained without increasing the coefficient of elasticity of the disc spring 83 to a high value. Therefore, the elastic coefficient of the disc spring 83, that is, the spring capacity, can be relatively small.

When rotating at a low speed such as in the idling state, the roller weights 41 move inward in the radial direction and clutch enters the state in which the pressure plate 77 does not press the plate group 66 into contact with each other. In other words, the clutch is disengaged. When the rotational speed of the engine increases from that in the idling state, the roller weights 41 move outward in the radial direction and the pressure plate 77 presses the plate group 66 into frictional contact with each other. In other words, the clutch becomes engaged. In the clutch 2 according to the present embodiment, because the elastic coefficient of the disc spring 83 is relatively small, at the time when the clutch becomes engaged, the rotational speed of the engine is not required to be very high and the amount of deformation of the disc spring 38 is relatively small. Therefore, the force applied by the pressure plate 77 so as to press the plate group 66 is relatively weak. Thus, the plate group 66 is not abruptly pressed into contact with each other and the clutch 2 is smoothly engaged.

Effect of First Embodiment

As described above, according to the first embodiment of the present invention, the clutch 2 includes a power-assist mechanism 200 and so can reduce the force necessary for disengaging the clutch 2. The clutch 2 also includes one or more roller weights 41 which move outward in a radial direction by a movement amount according to the magnitude of centrifugal force and presses the pressure plate 77 toward the plate group 66 with force according to the movement amount. Therefore, if the engine speed is high, the roller weights 41 move outward in a radial direction, so that the force with which the pressure plate 77 presses the plate group 66 into contact with each other can be made relatively large. Thus, even though the engine speed is high, slipping in the plate group 66 can be prevented, and the power transmission efficiency of the clutch 2 can be improved. Meanwhile, if an engine speed is low, the roller weights 41 move inward in a radial direction, so that the force with which the pressure plate 77 presses the plate group 66 into contact with each other can be kept relatively small. Therefore, the shift shock which occurs when the clutch 2 is engaged in an idling state can be reduced. Therefore, the clutch 2 according to the present embodiment can reduce not only the operational load for disengaging the clutch but also the shift shock which occurs when the clutch 2 is engaged in an idling state.

According to the first embodiment of the present invention, the pressure plate 77 is supported by or connected to the clutch housing 46 to rotate together with the clutch housing 46. The cam surfaces 81 which guide the roller weights 41 rightward as they moves further outward in the radial direction are formed on a right surface section of the pressure plate 77. The clutch 2 includes an abutment member 70 that presses the roller weights 41 toward the cam surface 81 of pressure plate 77. The roller weights 41 receive a reaction force from the abutment member 70 and press the pressure plate 77 toward the plate group 66.

The pressure plate 77 presses the plate group 66 into contact with each other. The pressure plate 77 also supports and guides the roller weights 41. Therefore, there is no need for separately providing a member for pressing the plate group 66 into contact with each other and a member for supporting and guiding the roller weights 41. Accordingly, according to the first embodiment of the present invention, the number of components of the clutch 2 can be decreased, and it is possible to make the clutch 2 more compact.

In addition, according to the first embodiment of the present invention, the clutch 2 includes a sub clutch 100. The sub clutch 100 includes the friction plate 101 provided to rotate together with the pressure plate 77, the first pressing plate 102 which comes into contact with the first friction surface 101a of the friction plate 101 when the clutch is disengaged to press the friction plate 101 to the right, and the second pressing plate 103 which comes into contact with the second friction surface 101b of the friction plate 101 when the clutch is disengaged and is pressed into contact with the friction plate 101 to receive torque from the pressure plate and transmits the torque to the power-assist mechanism 200.

As described above, the friction plate 101 includes the two friction surfaces 101a and 101b. Therefore, torque can be efficiently transmitted to the power-assist mechanism 200 from the pressure plate 77.

In the first embodiment of the present invention, the sub clutch 100 is disposed between the clutch boss 48 and the abutment member 70 with respect to an axial direction of the main shaft 33. That is, a space between the clutch boss 48 and the abutment member 70 is effectively used as an installation space for the sub clutch 100. Therefore, it is possible to make the clutch 2 more compact.

Further, the clutch 2 according to the present embodiment includes a main shaft 33 supported by or connected to the clutch boss 48 to rotate according to the clutch boss 48, and the through hole 33a which extends in an axial direction is formed inside the main shaft 33. The clutch 2 also includes a push mechanism 43, and the push mechanism 43 includes a short push rod 43a such that at least a portion thereof is inserted into the through hole 33a to push the first pressing plate 102 to the right when the clutch is disengaged. The oil supply path 110 which supplies oil to the sub clutch 100 is formed within the short push rod 43a.

As described above, according to the first embodiment of the present invention, oil can be supplied directly to the sub clutch 100 through the oil supply path 110. That is, not only oil dispersed in the crankcase 31 is supplied to the sub clutch 100, but also oil can be directly supplied to the sub clutch 100 through the oil supplying path 110. Therefore, since sufficient amount of oil can be supplied to the sub clutch 100, abrasion of the sub clutch 100 can be suppressed.

In the clutch 2 according to the first embodiment of the present invention, the power-assist mechanism 200 comprises a ball cam. Therefore, the power-assist mechanism 200 can be reduced in size. The power-assist mechanism 200 is not limited to a ball cam configuration. Other suitable power-assist configurations may be employed.

The clutch 2 according to the present embodiment is a multi-plate type clutch in which a plurality of friction plates 64 and a plurality of clutch plates 65 are alternately disposed. However, the clutch 2 may be a single-plate type clutch including a single friction plate and a single clutch plate or a friction clutch of another type which transmits drive force with frictional force. However, a multi-plate type clutch is typically larger in clutch capacity than a single-plate type clutch. In other words, the drive force transmitted through the clutch is larger. Therefore, reducing the operational load required to disengage the clutch and the shift shock occurring when the clutch 2 is engaged in an idling state is advantageously obtained.

Modification of First Embodiment

According to the above-described embodiment, in the idling state in which the rotational speed of the crankshaft is low, the clutch is set to a state in which the pressure plate 77 does not press the plate group 66 into contact with each other; that is, the clutch is in a disengaged state at a low speed such as an idling speed. However, the biasing force applied by the disc spring 83 and the coil spring 205 may be adjusted such that even in the idling state or the like in which the rotational speed is low, the clutch can be set to a state in which the pressure plate 77 presses the plate group 66 into frictional contact. In other words, the biasing force may be adjusted such that the clutch can be set to a so-called partially-applied clutch state.

In addition, the engine speed necessary for engaging the clutch 2, that is, a so-called "meet point" of the clutch 2, may be changed by adjusting the biasing force of the disc spring 83 and the coil spring 205.

As described above, the second cam plate 203 receives a slide force for moving toward the first cam plate 202 in the axial direction of the slide shaft 201 by means of a biasing force that is the sum of the biasing force of the disc spring 83 and that of the coil spring 205. In detail, the coil spring 205 urges the second cam plate 203 in the axial direction of the slide shaft 201 away from the first cam plate 202, which tends to separate them from each other. That is the coil spring 205 biases the second cam plate 203 and the slide shaft to the right. Because the slide shaft 201 is urged to the right by the coil spring 205, the second pressing plate 103 is also urged to the right by the coil spring 205. As described above, the second pressing plate 103 and the pressure plate 77 are configured to move integrally in the axial direction of main shaft 33 through the bearing 104. Therefore, the coil spring 205 urges the pressure plate 77 to the right.

The disc spring 83 urges in a direction that the pressure plate 77 presses the plate group 66 into a state of pressed-contact with each other. That is, the disc spring 83 biases the pressure plate 77 to the left. The biasing force of the disc spring 83 is larger than the biasing force of the coil spring 205. Therefore, the pressure plate 77 can press the plate group 66 into a state of pressed-contact with each other by using the centrifugal force of the roller weights 41. Consequently, the force with which the pressure plate 77 presses the plate group 66 into a state of pressed-contact with each other may be adjusted by adjusting the biasing force of the disc spring 83 and the coil spring 205. It is thereby possible to change the engine speed when the clutch 2 is engaged, that is, to change the meet point of the clutch 2.

Second Embodiment

In the first embodiment of the present invention, a mechanism for moving the pressure plate 77 in the axial direction of main shaft 33 according to the state of the clutch 2 is used that extends in an axial direction within the main shaft 33. This mechanism may be referred to as an "inner push" type mechanism. In the mechanism of the inner push type according to the first embodiment of the present invention, the slide shaft 201 is pushed in an axial direction of the short push rod 43a which passes through the interior of main shaft 33 to move in the axial direction. The mechanism, however, for moving the pressure plate 77 in the axial direction of the main shaft is not limited to the inner push type. In a second embodiment of the present invention, a so-called "outer pull" type mechanism for moving the pressure plate in the axial direction of main shaft is used. Further, that mechanism does not employ a structure that passes through the main shaft. Hereinafter, the outer pull mechanism according to the present embodiment will be described.

An ATV 9 having a friction clutch according to the present embodiment will be described in detail with reference to the drawings FIGS. 6-9. However, ATV 9 and the clutch 2, which will be described below, are mere examples of a preferred embodiment of the present invention. A vehicle according to the present embodiment is not limited to ATV 9. A vehicle according to the present embodiment may include other vehicles such as a motorcycle, a moped, a scooter and the like.

Figure 6:
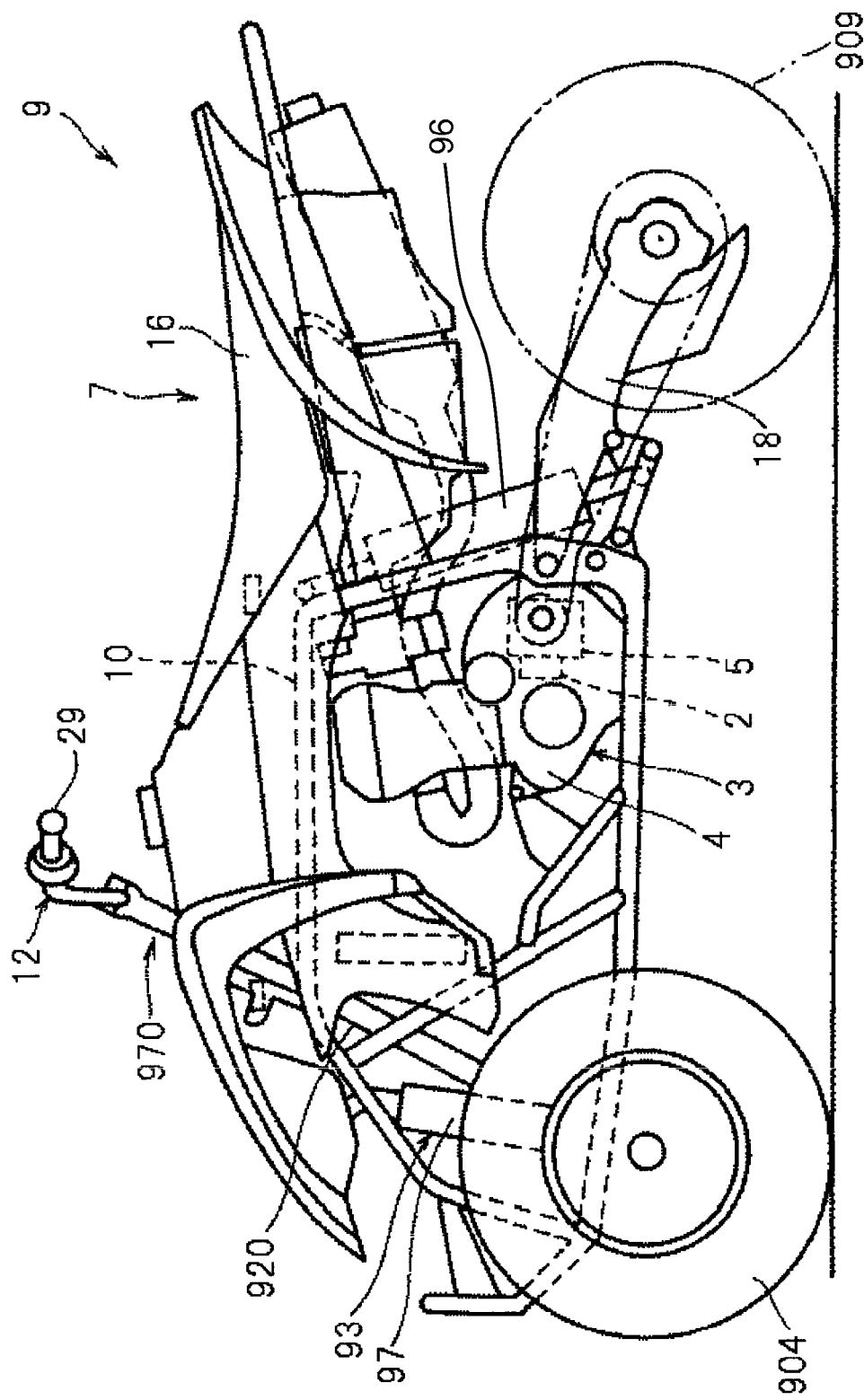
FIG. 6 is a side view illustrating an ATV (All-Terrain Vehicle).
Figure 7:
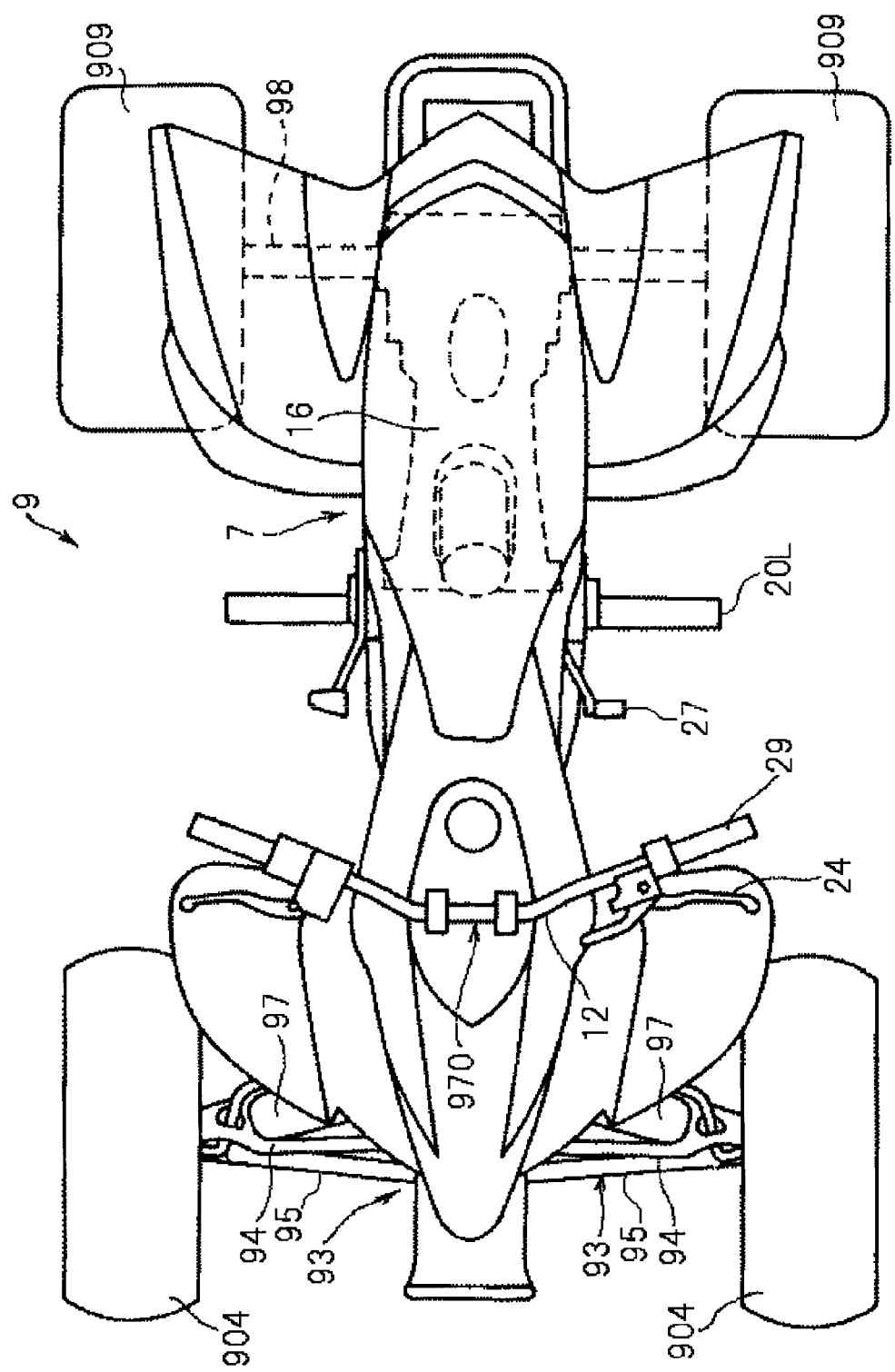
FIG. 7 is a top view of the ATV of FIG. 6.

FIG. 6 is a left side view illustrating the ATV 9 according to the second embodiment of the present invention. FIG. 7 is a top view illustrating the ATV 9 according to the second embodiment of the present invention. In the first and second embodiments, like reference numerals denote like parts, and so duplicated description will not be repeated.

The ATV 9 includes a vehicle body 7, a pair of right and left front suspensions 93, and a pair of right and left rear suspensions 98. The front suspension 93 is provided in a front portion of the vehicle body 7 and includes an upper arm 94, a lower arm 95, a steering knuckle (not shown), and a bumper 97. The upper arm 94 and the lower arm 95 are pivoted vertically to a front portion of a vehicle body frame 10, respectively. The steering knuckle is supported to pivoting ends of the upper arm 94 and the lower arm 95. A front wheel 904 is rotatably and steerably supported to the steering knuckle. The front shocks 97 are provided in a front portion of the vehicle body frame 10 and the lower arm 95. A pair of right and left rear wheels 909 are suspended from the rear suspension 98 in a rear portion of the vehicle body 7. The rear suspension 98 includes a rear shock 96 and a rear arm 18.

Further, the ATV 9 includes a steering system 970. The steering system 970 includes a steering shaft 920 and a handle 12. The steering shaft 920 is supported by the vehicle body frame 10 to freely pivot around an axis center. The steering shaft 920 extends backward and upward from a front lower side of the vehicle body frame 10 to be backwardly inclined. The handle 12 is attached to a top portion of the steering shaft 920.

In addition, a power unit 3 is supported by the vehicle body frame 10. The power unit 3 includes an engine 4, a clutch 2, and a transmission 5.

Clutch 2

Figure 8:
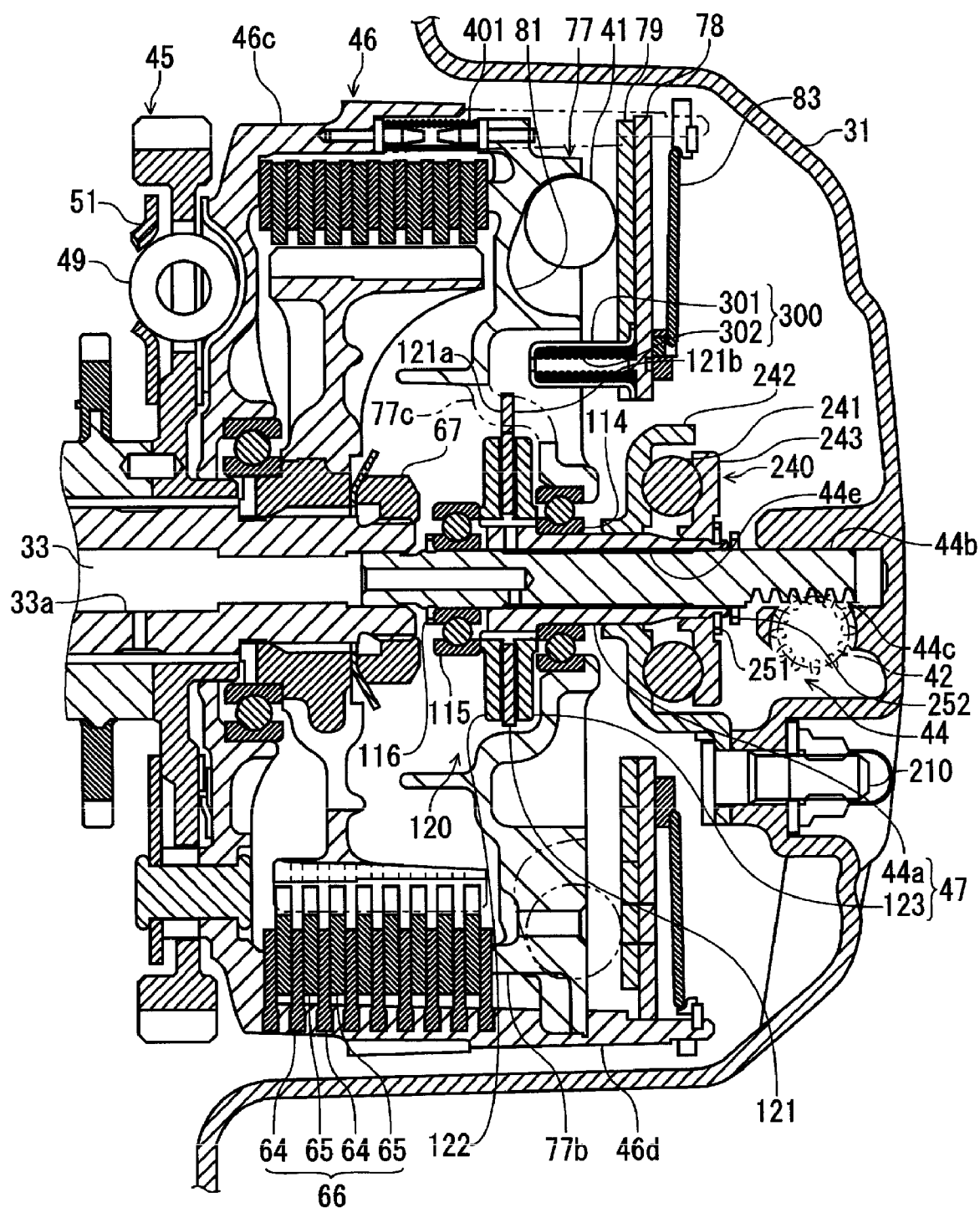
FIG. 8 is a cross-sectional view illustrating a clutch according to a second embodiment of the present invention.

FIG. 8 shows the clutch 2 according to the second embodiment of the present invention. In the first and second embodiments, like reference numerals denote like parts, and thus duplicated description will not be repeated.

Pressure Plate 77

As shown in FIG. 8, a roller retainer 78 is disposed to the right of a pressure plate 77. A spring holder 301 of an elastic member 300 is fixed to the roller retainer 78. The elastic member 300 includes the spring holder 301 and a spring 302.

The roller retainer 78 is urged to the left by a disc spring 83 which acts as a biasing member. That is, the roller retainer 78 is urged toward a plate group 66 by the disc spring 83. An elastic member retainer 79 is disposed between the pressure plate 77 and the roller retainer 78. The elastic member retainer 79 is configured as a plate which has annular shape when viewed in the axial direction of the main shaft 33. An outer end (in the radial direction) of the elastic member retainer 79 is engaged with arms 46d. The elastic member retainer 79 is thereby unable to rotate with respect to the clutch housing 46 and rotates together with the clutch housing 46.

The spring holder 301 is fixed to the elastic member retainer 79. The spring holder 301 has a cylindrical shape. One end of the spring 302 is fixed to the roller retainer 78. The other end of the spring 302 contacts a cylindrical head portion inside the spring holder 301. The spring holder 301 passes through the elastic member retainer 79. The spring holder 301 passes through the roller retainer 78 to be fixed to the elastic member retainer 79. The spring 302 is encapsulated in a more extended state than its original length inside the tubular interior of the spring holder 301. In other words, the spring 302 biases the roller retainer 78 to the left as a result of the springs natural recovery force attempting to return it to its original shape. The roller retainer 78 and the elastic member retainer 79 always contact each other with the bottom portion of the spring holder 301 interposed therebetween. The pressure plate 77 is urged to the left by roller weights 41 as a result of the biasing force of the spring 302 to press the plate group 66 into a state of pressed-contact with each other.

Off-Spring

As shown in FIG. 8, the clutch 2 according to the present embodiment includes an off-spring 401. The off-spring 401 is provided at an outer portion of the clutch housing 46 in the radial direction and is provided between a housing body 46c and the pressure plate 77 with respect to the axial direction of the main shaft 33. The off-spring 401 extends in the axial direction of the main shaft 33 between the housing body 46c and the pressure plate 77. A plurality of off-springs 401 are preferably provided between the housing body 46c and the pressure plate 77. As described above, the housing body 46c is formed in a cylindrical shape. A plurality of off-springs 401 are symmetrically disposed relative to a predetermined imaginary straight line which passes through a center of the main shaft 33 when viewed from an axial cross section of the main shaft 33. The number of off-springs 401 is not limited to a certain number. Therefore, if three off-springs 401 are provided, for example, the three off-springs 401 would be disposed at a rotational angle interval of 120° along the outer cover of the housing body 46c when viewed from an axial cross section of the main shaft 33. The off-spring 401 may be formed by an elastic member such as a coil spring. In FIG. 8, only one off-spring 401 is shown.

When installed in clutch 2, the off-springs 401 are in a compressed state relative to their original size. Off-springs 401 are further compressed when the pressure plate 77 presses the plate group 66 since the plate group 66 moves in the axial direction of the main shaft 33. The off-springs 401 thereby bias the pressure plate 77 in a reverse direction to the direction that the pressure plate 77 presses the plate group 66.

The roller retainer 78 is urged leftward toward the plate group 66 by the disc spring 83. Therefore, the plate group 66 is pressed into contact with each other by a pressing force based on the centrifugal force of the roller weights 41, the biasing force of the disc spring 83 and the biasing force of the spring 302. By contrast, the off-spring 401 generates a biasing force which counteracts the pressing force based on the centrifugal force of the roller weights 41, the biasing force of the disc spring 83 and the biasing force of the spring 302. Thus, the biasing force of the off-spring 401 reduces the force with which the pressure plate 77 presses the plate group 66.

Sub Clutch 120

As shown in FIG. 8, the clutch 2 according to the present embodiment includes a sub clutch 120. The sub clutch 120 includes a friction plate 121, a first pressing plate 122 facing a left surface (hereinafter, "first friction surface") 121a of the friction plate 121, and a second pressing plate 123 facing a right surface (hereinafter, "second friction surface") 121b of the friction plate 121.

The friction plate 121 is engaged with the pressure plate 77 to rotate together with the pressure plate 77. Specifically, one or more slide arms 77c are formed in the pressure plate 77. On the other hand, one or more corresponding grooves (not shown) are formed in an outer portion of the friction plate 121 in a radial direction. Each groove of the friction plate 121 is slidably engaged with a slide arm 77c, and the friction plate 121 is configured to rotate together with the pressure plate 77.

An outer rod 44a is fitted into the first pressing plate 122 by way of matching serrated surfaces. Therefore, the first pressing plate 122 rotates together with the outer rod 44a, but can move in an axial direction relative to the outer rod 44a.

Outer rod 44a is also fitted into the second pressing plate 123 by way of matching serrated surfaces. Therefore, the second pressing plate 123 rotates together with the outer rod 44a, but can move in an axial direction relative to the outer rod 44a.

The second pressing plate 123 and the outer rod 44a form a torque transmission member 47. The second pressing plate 123 is pressed into contact with the friction plate 121 pressed by the first pressing plate 122 when the clutch is disengaged, which will be described later. Therefore, the second pressing plate 123 receives torque from the pressure plate 77. The outer rod 44a transmits the torque received by the second pressing plate 123 from the pressure plate 77 to a power-assist mechanism 240 which will be described later. In other words, the torque transmission member 47 is pressed into frictional contact with the pressure plate 121, which is pressed by the first pressing plate 122, to receive torque from the pressure plate 77 when the clutch is engaged. The torque transmission member 47 transmits the torque received from the pressure plate 77 to the power-assist mechanism 240.

The outer rod 44a rotatably supports the pressure plate 77 through a bearing 114. The outer rod 44a and the pressure plate 77 can thereby rotate relative to each other. The outer rod 44a, the bearing 114 and the pressure plate 77 move integrally in an axial direction. A through-hole 44e, which extends in an axial direction, is formed within the outer rod 44a.

An inner rod 44b is provided on the inner portion of the outer rod 44a in a radial direction. The inner rod 44b passes through the through-hole 44e of the outer rod 44a. Therefore, the inner rod 44b and the outer rod 44a can slide relative to each other in the axial direction and coaxially rotate relative to each other.

One end of the inner rod 44b is fitted into the interior of the main shaft 33. A portion of the inner rod 44b on the opposite end is fitted into a bearing 115. Therefore, the inner rod 44b is supported by the bearing 115 to rotate around an axis center. A portion of the inner rod 44b is fitted into the bearing 114 through the outer rod 44a. The outer rod 44a is thereby also supported by the bearing 114 so as to be rotatable around an axis center.

A stopper 116 is provided on the inner rod 44b, as shown in FIG. 8. The stopper 116 is engaged with the inner rod 44b to the left of the bearing 115. The stopper 116 can move in an axial direction together with the inner rod 44b.

A rack 44c is formed on the other end of the inner rod 44b. A pinion wheel 42 is operatively coupled to rack 44c. The rack 44c and the pinion wheel 42 are formed by, for example, a gear mechanism. Since the rack 44c and the pinion wheel 42 are engaged with each other, as the pinion wheel 42 operates, the rack 44c can move in the axial direction (left-right direction in FIG. 8). The rack 44c has, for example, a cylindrical shape, and a shaft of the pinion wheel 42 extends in an orthogonal direction with respect to FIG. 8. As a result, the rack 44c can rotate in a circumferential direction about the axis of the inner rod 44b. In addition, a clutch release mechanism 44 comprises the pinion wheel 42 and the rack 44c. The pinion wheel 42 and the rack 44c of the clutch release mechanism 44 are disposed on the right side of the power-assist mechanism 240.

The pinion wheel 42 of the clutch release mechanism 44 is mechanically connected to a clutch lever 24. Therefore, when the clutch lever 24 is operated, the pinion wheel 42 rotates in a circumferential direction and the inner rod 44b moves to the right in an axial direction.

If the inner rod 44b moves to the right, the bearing 115 presses the first pressing plate 122. The first pressing plate 122 thereby moves to the right together with the inner rod 44b and the bearing 115. The first pressing plate 122 presses the friction plate 121 toward the second pressing plate 113. As a result, the friction plate 121 is frictionally sandwiched between the first pressing plate 122 and the second pressing plate 123. Torque generated by the friction plate 77 is thereby transmitted to the first pressing plate 122 and the second pressing plate 123 through the friction plate 121 causing the first pressing plate 122 and the second pressing plate 123 to rotate.

Power-Assist Mechanism

As shown in FIG. 8, the clutch 2 according to the present embodiment includes a power-assist mechanism 240. The power-assist mechanism 240 converts part of the torque of the pressure plate 77 into force for disengaging the clutch 2 and decreases the force necessary for disengaging the clutch 2. The power-assist mechanism 240 according to the present embodiment comprises a ball cam. Specifically, the power-assist mechanism 240 comprises a first cam plate 242, a second cam plate 243, a plurality of balls 241, and the outer rod 44a, as described above.

In the present embodiment, three balls 241 are provided in the power-assist mechanism 240. The three balls 241 are disposed between the first cam plate 242 and the second cam plate 243 so that the balls 241 may freely roll between the first cam plate 242 and the second cam plate 243. The three balls 241 are disposed at regular intervals along a circumferential direction about a common longitudinal axis of the inner rod 44b and the outer rod 44a. However, the number of balls 241 provided in the power-assist mechanism 240 is not limited to three. Other ball implementations may be utilized, as needed. Each ball 241 can move along an imaginary curve (the dashed-dotted curve shown in FIG. 9), as described later.

Figure 9C:
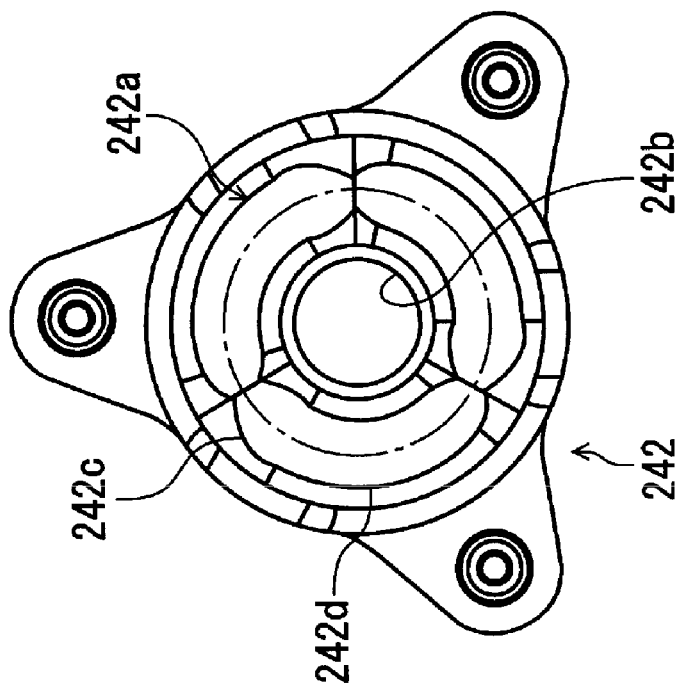
FIG. 9c is a front view illustrating the first cam plate.
Figure 9B:
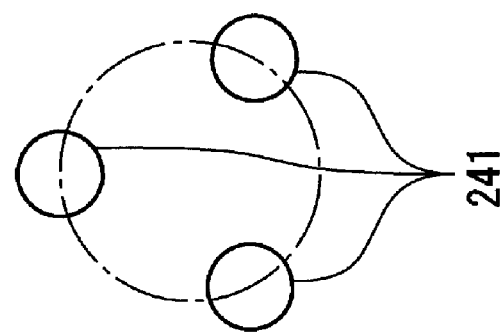

Each of the first cam plate 242 and the second cam plate 243 has a disc-like shape. As shown in FIG. 9(c), a through hole 242b is formed centrally within the first cam plate 242. As shown in FIG. 8, the inner rod 44b and the outer rod 44a are inserted through the through hole 242b. The outer rod 44a freely moves in the axial direction (of main shaft 33) and freely rotates with respect to the first cam plate 242. That is, the first cam plate 242 is configured not to rotate even though the outer rod 44a rotates. In addition, the first cam plate 242 is configured not to move even though the outer rod 44a moves in the axial direction.

Figure 9A:
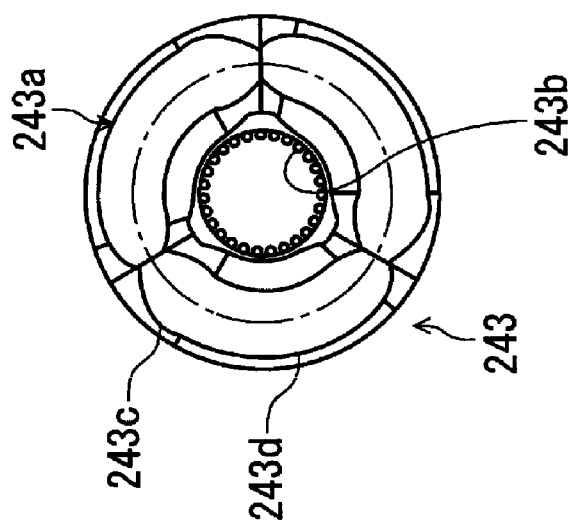
FIG. 9a is a rear view illustrating a second cam plate of a power-assist mechanism according to the second embodiment of the present invention.

As shown in FIG. 9(a), a serrated hole 243b is formed centrally within the second cam plate 243. The outer rod 44a is fitted into the hole 243b of cam plate 243 via a matching serrated surface. Therefore, the second cam plate 243 can freely slide (move) in the axial direction with respect to the outer rod 44a but rotates together with the outer rod 44a.

The first cam plate 242 is secured to the crankcase 31 via a plurality of pins 210 which are fixed thereto. Therefore, the first cam plate 242 is fixed with respect to the crankcase 31. In FIG. 8, only one pin 210 is shown.

As also shown in FIG. 8, a stopper 251 is provided on the outer rod 44a. The stopper 251 is fixed to a right terminal end of the outer rod 44a. The second cam plate 243 is restricted as to moving to the right in the axial direction with respect to the outer rod 44a by the stopper 251. The outer rod 44a is thereby restricted by the stopper 251 as to moving to the left in an axial direction with respect to the second cam plate 243.

As shown in FIG. 8, a stopper 252 is provided on the inner rod 44b. The stopper 252 is fixed to the right of the rack 44c of the inner rod 44b. The inner rod 44b is restricted to moving to the left in an axial direction with respect to the outer rod 44a. That is, the outer rod 44a is restricted by the stopper 252 as to moving to the left in an axial direction with respect to the inner rod 44b.

First cam grooves 242a are formed on a right surface (a front surface in FIG. 9(c)) of the first cam plate 242. A ball receiving groove 242c is formed at one end of each of the first cam grooves 242a. Second cam grooves 243a are formed on a left surface (a front surface in FIG. 9(a)) of the second cam plate 243. A ball receiving groove 243c is formed at one end of each of the second cam grooves 243a. The ball receiving grooves 242c and the ball receiving grooves 243c are disposed relatively deeper (left-right width in FIG. 8) than other portions of the first cam grooves 242a and the second cam grooves 243a, respectively. The other portion of each cam groove 243a, which is shallower (left-right width in FIG. 8) than the ball receiving groove 242c, is shown as a ball moving groove 242d in FIG. 9(c). The other portion of each cam groove 243b, which is shallower (left-right width in FIG. 8) than the ball receiving groove 243c, is shown as a ball moving groove 243d in FIG. 9(a). The ball moving surfaces 242d and 243d are inclined toward the opposing cam plate from the ball receiving grooves 242c and 243d, respectively.

The first cam grooves 242a and the second cam grooves 243a are formed so that when the second cam plate 243 rotates in a predetermined direction, each ball 241 moves up onto a ball moving groove 242d and a ball moving groove 243d from the ball receiving groove 242c and the ball receiving groove 243c. By contrast, when the second cam plate 243 rotates in an direction opposite to the predetermined direction, the balls 241 are received between the ball receiving groove 242c and the ball receiving groove 243c. In other words, cam grooves 242a and 243a are formed so that both cam plates 242 and 243 are forced to separate when the second cam plate 243 rotates in a predetermined direction against the total urging force of the disc spring 83, the off-spring 401 and the elastic member 300. The second cam plate 243 is thereby pushed to the right and moves away form the first cam plate 202 as the second cam plate is rotated in the predetermined direction. In addition, both cam grooves 242a and 243a are formed so that the total urging force of the disc spring 83, the off-spring 401 and the elastic member 300 moves the second cam plate 243 to the left when the second cam plate 243 rotates in a reverse direction.

Operation of Clutch

Next, the operation of the clutch 2 according to the second embodiment will be described. An operation for disengaging the clutch 2 will be first described.

If a rider of the ATV 9 grasps the clutch lever 24 (see FIG. 1), the pinion wheel 42 rotates in a predetermined direction. As the pinion wheel 42 rotates in the predetermined direction, the inner rod 44b rotates in a circumferential direction about its axis while moving to the right. Then, the stopper 116 and the bearing 115 contact each other, and the inner rod 44b, the stopper 116 and the bearing 115 move to the right in the axial direction. The bearing 115 comes into contact with the first pressing plate 122, so that the first pressing plate 122 moves to the right in the axial direction. That is, both the inner rod 44b and the first pressing plate 122 move to the right in the axial direction. As a result, the first pressing plate 122 presses the friction plate 121. The friction plate 121 of the sub clutch 120 is thereby frictionally sandwiched between the first pressing plate 122 and the second pressing plate 123, so that the sub clutch 120 enters an engaged state. Accordingly, the outer rod 44a rotates in the predetermined direction with the pressure plate 77.

If the outer rod 44a rotates in the predetermined direction, the second cam plate 243 of the power-assist mechanism also rotates in the same direction. The three balls 241 move up onto opposing ball moving grooves 242d and ball moving grooves 243d from opposing ball receiving grooves 242c and ball receiving grooves 243c, respectively, and the second cam plate 243 is pressed to the right by the balls 241. The outer rod 44a is also pressed to the right thereby. As a result, the force with which the inner rod 44b pushes the pressure plate 77 to the right through the first pressing plate 122 and the friction plate 121 and the force with which the outer rod 44a pulls the pressure plate 77 to the right via the bearing 114 cause the pressure plate 77 to move to the right. Accordingly, the pressed-contact state of the plate group 66 is released, so that the clutch 2 is disengaged.

Next, an operation for engaging the clutch 2 will be described.

In order to engage the clutch 2, a rider releases the clutch lever 24 which he or she had gripped. The biasing force of the disc spring 83 and the elastic member 300 cause the friction plate 121 and the first pressing plate 122 of the sub clutch 120 to move to the left. The friction plate 121 and the first pressing plate 122 of the sub clutch 120 are thereby separated from the second pressing plate 123. Therefore, the force with which the inner rod 44b pushes the pressure plate 77 to the right through the first pressing plate 122 and the friction plate 121 and the force with which the outer rod 44a pulls the pressure plate 77 to the right through the bearing 114 are thereby released. The rightward pressing force against the outer rod 44a disappears, and the outer rod 44a moves to the left together with the pressure plate 77 and the bearing 114 which receives the biasing force of the disc spring 83 and the elastic member 300. At this time, the second cam plate 243 rotates in a reverse direction of the predetermined direction. As the second cam plate 243 rotates in the reverse direction, the second cam plate 243 and the outer rod 44a move to the left. In addition, balls 241 move from being on opposing inclined portions of ball moving grooves 242d and ball moving grooves 243d to being accommodated between opposing ball receiving grooves 242c and ball receiving grooves 243c, respectively.

In addition, the pressure plate 77 moves to the left by the biasing force of the disc spring 83 and the elastic member 300 since the rightward pressing force of the first pressing plate 122 is released. As a result, the pressure plate 77 causes the plate group 66 to enter into a pressed-contact state with each other, whereby the clutch 2 is engaged. At this time, the friction plate 121 of the sub clutch 120 is separated from the second pressing plate 123.

In the clutch 2 according to the second embodiment of the present invention, the urging force which the pressure plate 77 receives from the disc spring 83, the elastic member 300 and the off-spring 401 varies according to the radial position of the roller weights 41. Specifically, when the rotational speed of the pressure plate 77 is high, the roller weights 41 move outward in a radial direction. As a result, the roller weights 41 move rightward to greatly deform the disc spring 83, the elastic member 300 and the off-spring 401. Therefore, the biasing force which the pressure plate 77 receives from the disc spring 83, spring 302, and off-spring 401, increases relatively because each spring is deformed greatly. As a result, large biasing forces can be achieved without the need to set a high coefficient of elasticity for each of the disc spring 83, the elastic member 300 and the off-spring 401, respectively. On the other hand, when the rotational speed of the pressure plate 77 is low, the roller weights 41 move inward in the radial direction. As a result, the roller weights 41 move to the left and the deformation of the disc spring 83, the elastic member 300 and the off-spring 401 decreases. Therefore, the biasing force which the pressure plate 77 receives from the disc spring 83, the elastic member 300 and the off-spring 401 also decreases accordingly.

When the rotational speed of the engine is high, the pressure plate 77 presses the plate group 66 into contact with each other with a large pressing force. In the clutch 2 according to the second embodiment, when the rotational speed of the engine increases, the roller weights 41 move outward in a radial direction and the amount of deformation of the disc spring 83 and the elastic member 300 thereby increases accordingly. Thus, a sufficiently large pressing force can be obtained without increasing the coefficient of elasticity of the disc spring 83 and the elastic member 300. Therefore, the elastic coefficient of the disc spring 83 and the elastic member 300, that is the spring capacity, can be relatively small.

When the engine is rotating at a low speed such as an idling state, the roller weights 41 move inward in the radial direction and the state in which the pressure plate 77 is in pressure contact with the plate group 66 is canceled. In other words, the clutch is disengaged. When the rotational speed of the engine increases from that in the idling state, the roller weights 41 move outward in the radial direction and the pressure plate 77 presses the plate group 66 into frictional contact with each other. In other words, the clutch becomes engaged. However, in the clutch 2 according to the present embodiment, because the elastic coefficient of the disc spring 83 and elastic member 300 are relatively small, at the time when the clutch becomes engaged, the rotational speed of the engine is not required to be very high and the amount of deformation of the disc spring 83 and the elastic member 300 is relatively small. Therefore, the force applied by the pressure plate 77 to press the plate group 66 into contact with each other is relatively weak. In addition, the off-spring 401 urges the pressure plate 77 in a reverse direction of the direction in which the pressure plate 77 presses the plates of plate group 66 into contact with each other. That is, the off-spring 401 urges the pressure plate 77 in an opposite direction to the direction that the disc spring 83 and the elastic member 300 urge the pressure plate 77. Thus, the plate group 66 is prevented from being abruptly pressed into contact with each other and the clutch 2 is smoothly engaged.

Also in the second embodiment of the present invention, adjusting the biasing force of the disc spring 83, the elastic member 300 and the off-spring 401 enables the pressure plate 77 to press the plate group 66 into contact with each other to enter a so-called partially engaged clutch state even during a low speed rotation such as an idling state.

Also, in the second embodiment of the present invention, adjusting the biasing force of the disc spring 83, the elastic member 300 and the off spring 401 can change the engine speed at which the clutch 2 is engaged, that is, the so called meet point of the clutch 2.

The disc spring 83 applies biasing force in the direction that the pressure plate 77 presses the plates of plate group 66 into contact with each other. Thus, the disc spring 83 urges the pressure plate 77 to the left. The biasing force of the disc spring 83 is larger than biasing force of the off-spring 401. In addition, the elastic member 300 presses the pressure plate 77 toward the plate group 66 through the elastic member retainer 79 and the roller weights 41, as shown in reference to FIG. 8. Therefore, the pressure plate 77 can press the plates of plate group 66 into contact with each other by using the centrifugal force of the roller weights 41. Thus, adjusting the biasing force of the disc spring 83, the elastic member 300 and the off-spring 401 results in a corresponding adjustment of the force with which the pressure plate 77 presses the plates of plate group 66 into contact with each other. It is thereby possible to change an engine speed when the clutch 2 is engaged, that is, a so-called meet point of the clutch 2.

As described above, in the clutch 2 according to the second embodiment of the present invention, the torque transmission member 47 includes the outer rod 44a and the second pressing plate 123. In addition, the clutch 2 according to the present embodiment includes the inner rod 44b. The inner rod 44b is received within the through-hole 44e of the outer rod 44a to move in an axial direction relative to the outer rod 44a and moves in an axial direction to press the first pressing plate 122 into the friction plate 121. The inner rod 44b includes the rack 44c. The inner rod 44b is pulled in an axial direction (left-right direction in FIG. 8) according to rotation of the pinion wheel 42 as the rack 44c and the pinion wheel 42 are engaged with each other. That is, the pinion wheel 42 rotates to move the rack 44c. As a result, the inner rod 44b moves to the right in an axial direction. In addition, in the second embodiment of the present invention, the clutch release mechanism 44 comprises the pinion wheel 42 and the rack 44c. Therefore, as the clutch release mechanism 44 pulls the inner rod 44b in an axial direction, the inner rod 44b also moves in the axial direction. At this time, the inner rod 44b moves to the right as shown in FIG. 6.

The rack 44c and the pinion wheel 42 of the clutch release mechanism 44 are disposed at a right side of the power-assist mechanism 240. That is, as shown in FIG. 8, the rack 44c and the pinion wheel 42 of the clutch release mechanism 44 are disposed outside the vehicle body. Therefore, the pinion wheel 42 and the clutch lever 24 are easily connected.

As described above, the present invention can be applied to a friction clutch and a vehicle equipped with the same.

It is to be clearly understood that the above description was made only for purposes of an example and not as a limitation on the scope of the invention as claimed herein below.

What is claimed:

1. A friction clutch, comprising:
   a drive side rotating body having a first plate and an axis of rotation;
   a driven side rotating body arranged coaxially with the drive side rotating body and having a second plate opposite to the first plate in a predetermined direction along the axis of rotation;
   a pressure plate which rotates together with the drive side rotating body and adapted to move in the predetermined direction to press the first plate and the second plate into frictional contact with each other;
   a power-assist mechanism which receives torque from the pressure plate when the clutch is disengaged, and converts the torque into force for moving the pressure plate in a direction which separates the first plate from the second plate; and
   a centrifugal weight which moves outward in a radial direction by a movement amount according to the magnitude of a centrifugal force and presses the pressure plate toward the first plate and the second plate with a force according to the movement amount.

2. The friction clutch of claim 1, further comprising:
   a cam surface formed on a surface of the pressure plate opposite to the first plate and second plate, the cam surface extending radially outward on the pressure plate and adapted to guide the centrifugal weight away from the first and second plates as the centrifugal weight moves outward in the radial direction along the cam surface; and
   an abutment member opposing the cam surface so that the centrifugal weight is interposed between the abutment member and the cam surface, the abutment member pressing the centrifugal weight toward the cam surface.

3. The friction clutch of claim 2, wherein the pressure plate is supported on the drive side rotating body.

4. The friction clutch of claim 1, further comprising a sub clutch including:
   a friction plate coaxially arranged to rotate together with the pressure plate and which has a first friction surface provided on one side and a second friction surface provided on the other side;
   a pressing member configured to come into contact with the first friction surface and press the friction plate when the clutch is disengaged;
   a torque transmission member which is disposed opposite to the second friction surface of the friction plate and is pressed into contact with the friction plate by the pressing member to receive torque of the pressure plate and to transmit the torque to the power-assist mechanism when the clutch is disengaged.

5. The friction clutch of claim 4, wherein the pressure plate is supported on the drive side rotating body.

6. The friction clutch of claim 4, wherein:
   the drive side rotating body comprises a clutch housing, the clutch housing having a cylindrical shape;
   the driven side rotating body comprises a clutch boss coaxially disposed within the clutch housing;
   the pressure plate further comprises a cam surface formed on a surface opposite to the first plate and second plate, the cam surface extending radially outward on the pressure plate and adapted to guide the centrifugal weight away from the first and second plates as the centrifugal weight moves outward in the radial direction along the cam surface;
   an abutment member opposing the cam surface so that the centrifugal weight is interposed between the abutment member and the cam surface, the abutment member pressing the centrifugal weight toward the cam surface; and the sub clutch is disposed between the clutch boss and the abutment member with respect to the axis of rotation.

7. The friction clutch of claim 6, wherein the friction plate of the sub clutch is disposed at a central portion of the pressure plate.

8. The friction clutch of claim 4, further comprising:
a rotatable shaft having a through-hole extending in an axial and which is connected to the driven side rotating body to rotate together with the driven side rotating body; and
an operating shaft at least partially inserted into the through-hole of the rotatable shaft and arranged to push the pressing member into contact with the first friction surface when the clutch is disengaged; wherein
an oil supply path for supplying oil to the sub clutch is formed in the operating shaft.

9. The friction clutch of claim 4, wherein
the torque transmission member includes an outer rod which has an axial through-hole defined therein, the outer rod disposed coaxial with the axis of rotation and rotatable about the axis of rotation to transmit torque from the pressure plate to the power-assist mechanism; and
the friction clutch further comprises:
an inner rod which is received by the axial through-hole of the outer rod to freely move relative to the outer rod in an axial direction; and
a clutch release mechanism which is partially disposed at the other side of the power-assist mechanism, the clutch release mechanism pulling the inner rod in an axial direction toward the pressing member and thereby moving the inner rod in an axial direction to press the pressing member into the friction plate when the clutch is disengaged.

10. The friction clutch of claim 4, further comprising:
a rotatable shaft having a through-hole extending in an axial direction and which is connected to the driven side rotating body to coaxially rotate together with the driven side rotating body; and
an operating shaft at least partially inserted into the through-hole of the rotatable shaft and arranged to axially push the pressing member into contact with the first friction surface when the clutch is disengaged;
a slide shaft arranged at the other side of the operating shaft, the slide shaft rotates together with the torque transmission member to transmit torque of the pressure plate to the power-assist mechanism; and
a clutch release mechanism which axially displaces the operating shaft when the clutch is disengaged to cause the operating shaft to push the pressing member into contact with the first friction surface when the clutch is disengaged.

11. The friction clutch of claim 1, wherein the power-assist mechanism comprises a ball cam.

12. The friction clutch according to claim 1, wherein
the drive side rotator includes a plurality of first plates,
the driven side rotator includes a plurality of second plates, and
the plurality of first plates and the plurality of second plates are alternately disposed in the predetermined direction.

13. A vehicle comprising the friction clutch of claim 1.

14. The friction clutch of claim 2, further comprising at least one elastic member urging the abutment member toward the first plate and the second plate.

15. The friction clutch of claim 14, further comprising an off-spring which biases the pressure plate away from the first plate and the second plate.

16. The friction clutch of claim 15, further comprising a sub clutch configured to transmit torque received from the pressure plate and to the power-assist mechanism when the clutch is disengaged.

* * * * *